(12) United States Patent
Niwa et al.

(10) Patent No.: US 7,957,918 B2
(45) Date of Patent: Jun. 7, 2011

(54) MEMBER DESIGNING METHOD AND APPARATUS

(75) Inventors: Toshiyuki Niwa, Chiba (JP); Hiroshi Yoshida, Chiba (JP); Eiji Isogai, Chiba (JP); Yuichi Yoshida, Chiba (JP)

(73) Assignees: Nippon Steel Corporation, Tokyo (JP); Arcelor France, St. Denis (FR)

( * ) Notice: Subject to any disclaimer, the term of this patent is extended or adjusted under 35 U.S.C. 154(b) by 563 days.

(21) Appl. No.: 11/922,930

(22) PCT Filed: Jun. 28, 2006

(86) PCT No.: PCT/JP2006/312898
§ 371 (c)(1),
(2), (4) Date: Dec. 27, 2007

(87) PCT Pub. No.: WO2007/004487
PCT Pub. Date: Jan. 11, 2007

(65) Prior Publication Data
US 2009/0119031 A1    May 7, 2009

(30) Foreign Application Priority Data

Jun. 30, 2005  (JP) ................... 2005-192091
Jul. 5, 2005   (JP) ................... 2005-196506
Mar. 28, 2006  (JP) ................... 2006-089059

(51) Int. Cl.
*G01B 3/00* (2006.01)
(52) U.S. Cl. ...................................... 702/33
(58) Field of Classification Search .......... 702/33, 702/42; 703/1, 2, 7, 8
See application file for complete search history.

(56) References Cited

U.S. PATENT DOCUMENTS 6,353,768 B1 * 3/2002 Karafillis et al. ............... 700/97

FOREIGN PATENT DOCUMENTS

| JP | 6-162149 A    | 6/1994  |
| JP | 2001-116664 A | 4/2001  |
| JP | 2002-297670 A | 10/2002 |
| JP | 2003-149091 A | 5/2003  |
| JP | 2003-149130 A | 5/2003  |

(Continued)

OTHER PUBLICATIONS

Jakumeit, Parameter optimization of the sheet metal forming process using an iterative parallel Kriging algorithm Jan. 14, 2005, Springer Verlag.*

(Continued)

*Primary Examiner* — Drew A Dunn
*Assistant Examiner* — Stephen J Cherry
(74) *Attorney, Agent, or Firm* — Birch, Stewart, Kolasch & Birch, LLP

(57) ABSTRACT

A computer performs press forming analysis based on a shape of a formed product or of a member, a blank holder force, a friction coefficient, a tensile strength of a material, a yield strength, a stress-strain relation, and a sheet thickness, as press forming conditions, to calculate sheet thickness distribution and post-formation strain distribution of the formed product. The computer also performs performance analysis based on the sheet thickness distribution, the post-formation strain distribution, and the shape of the formed product or of the member, as state amounts of the formed product. This calculate performance of the member. The computer repeats the calculations performed in the process from the first step through the second step a predetermined number of times, with at least one of the press forming conditions being changed, to output an optimum press forming condition that gives a maximum value or a target value of the performance

40 Claims, 23 Drawing Sheets

FOREIGN PATENT DOCUMENTS

| | | |
|---|---|---|
| JP | 2004-13442 A | 1/2004 |
| JP | 2004-50253 A | 2/2004 |

OTHER PUBLICATIONS

"Simulation Analysis and Springback Prediction of Press-forming Numerical Valve of U-shaped Automotive Body Panel", pp. 26-53, Sep. 16, 2004.

"A Simulation Study on the Effects of Stamping Process on Crash Behavior of Thin-walled Panels", vol. 26, No. 2, pp. 233-235 and 245, Apr. 15, 2004.

"Study on Numerical Simulation Based Control Method for Movement of Welding Seam of Welding Splice Pieces", pp. 30-33, Feb. 24, 2004.

\* cited by examiner

F I G. 2
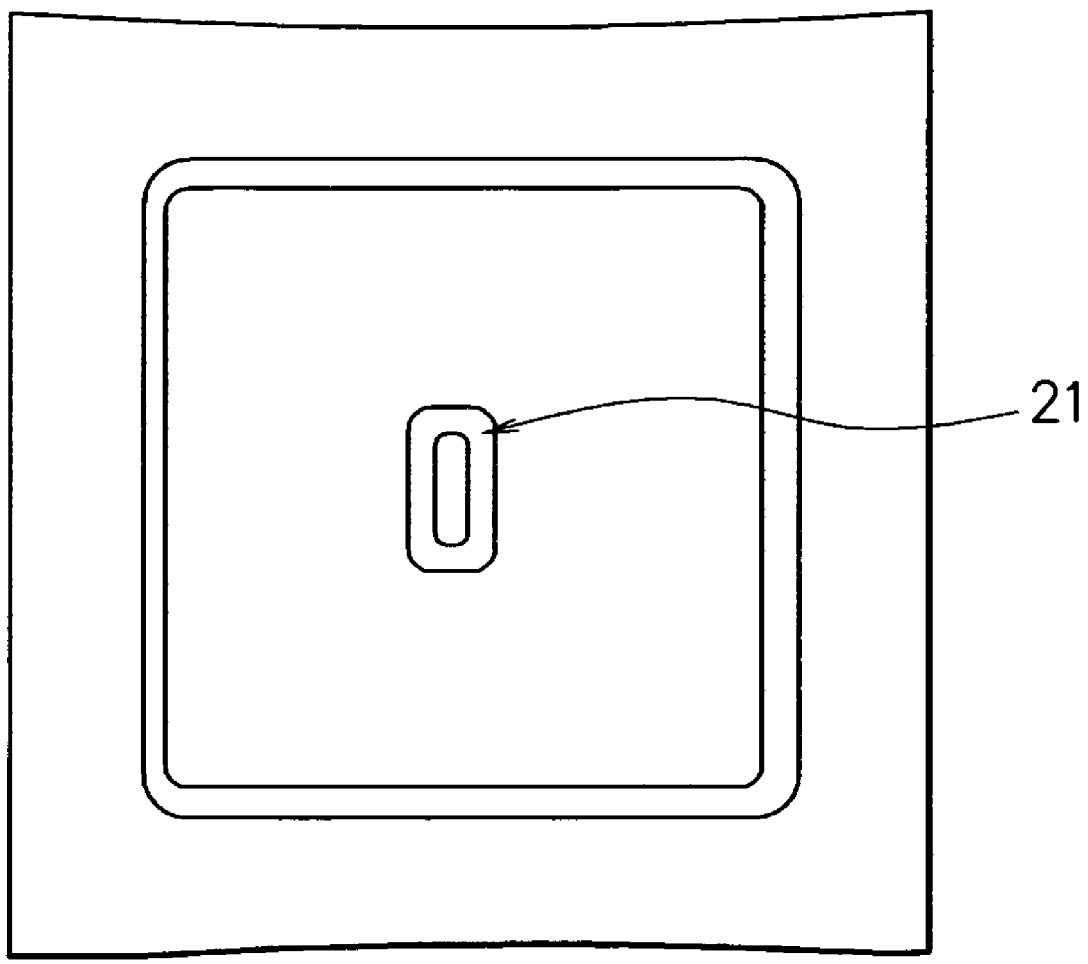

F I G. 4
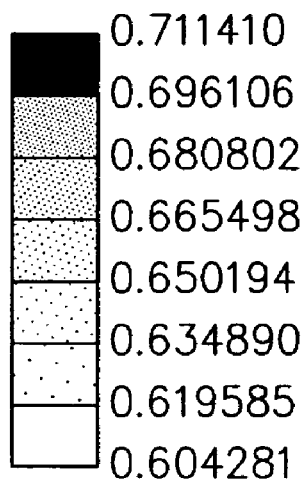
THICKNESS
0.711410
0.696106
0.680802
0.665498
0.650194
0.634890
0.619585
0.604281
Min=0.604281
Max=0.711410
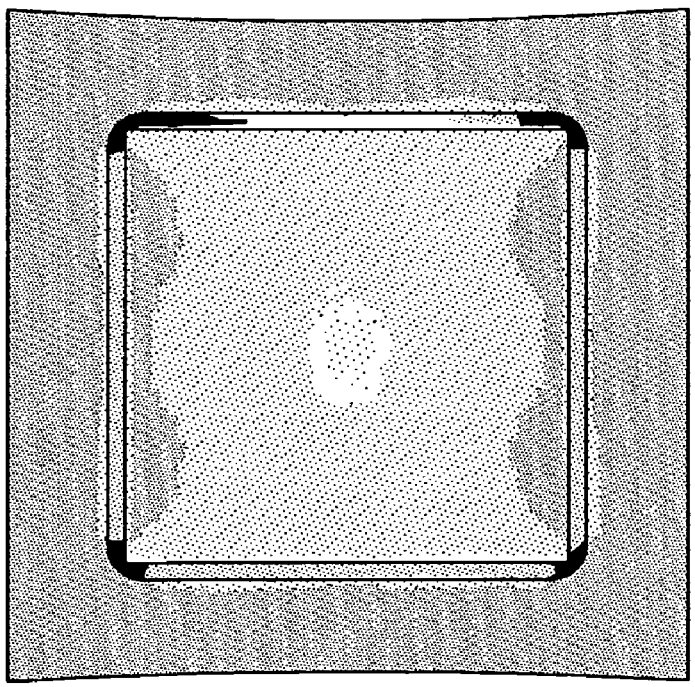

DIRECTIONAL STRAIN (0,1,0) − MEMBRANE (ENGINEER VALUE)

0.104793
0.085718
0.066642
0.047567
0.028492
0.009417
−0.009658
−0.028733

Min=−0.028733
Max=0.104793

THICKNESS 1.428382
1.418389
1.416475
1.414562
1.412648
1.410735
1.408821
1.406908

Min=1.406908
Max=1.428382

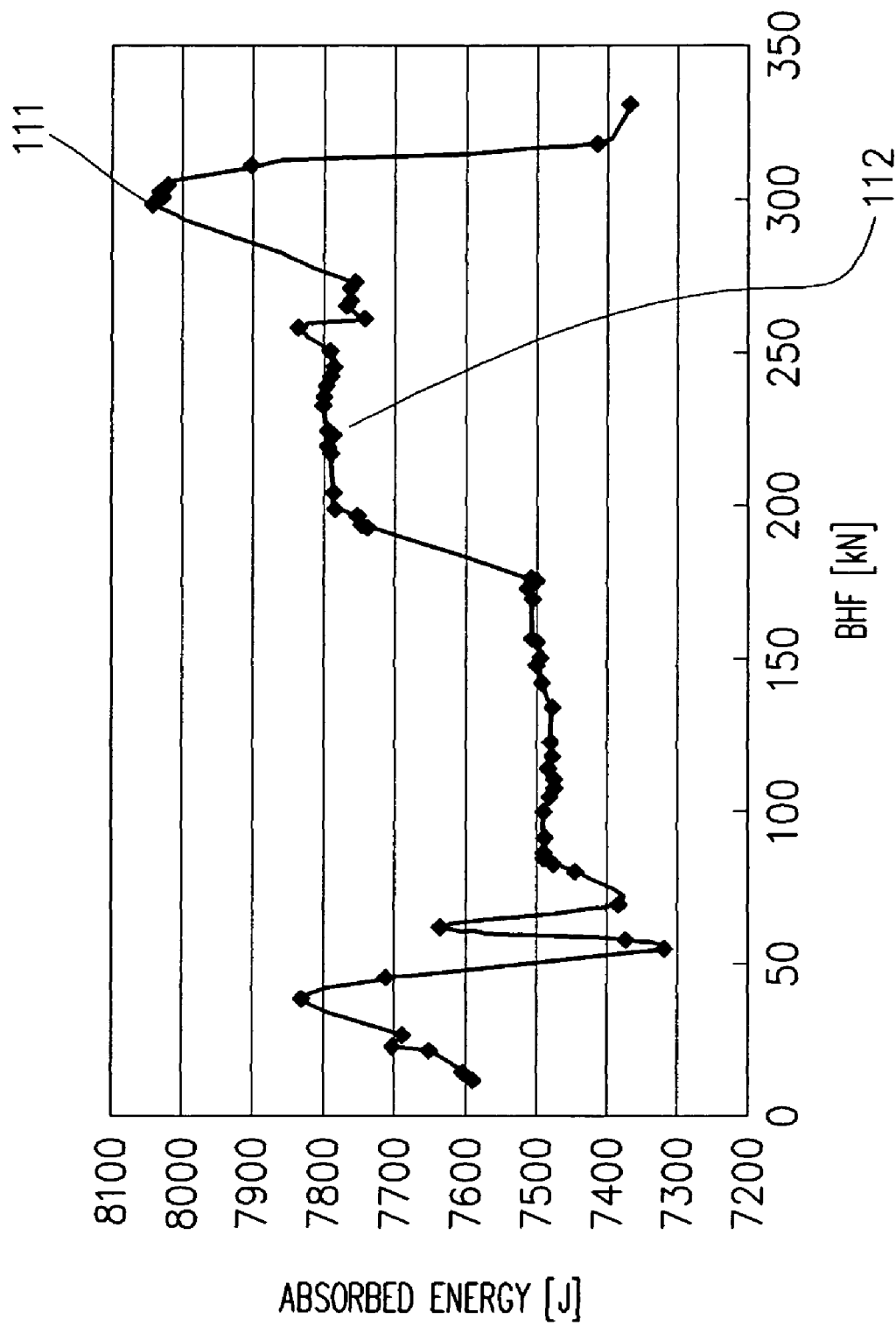
F I G. 11

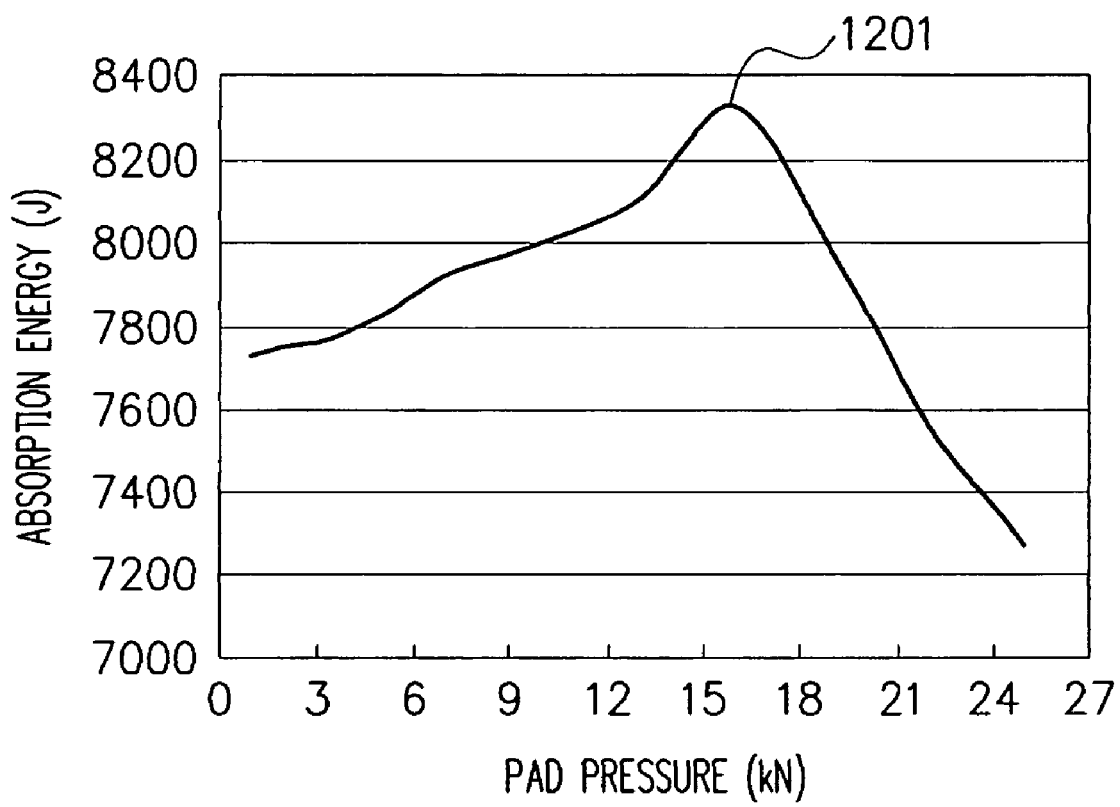
F I G. 12

F I G. 13
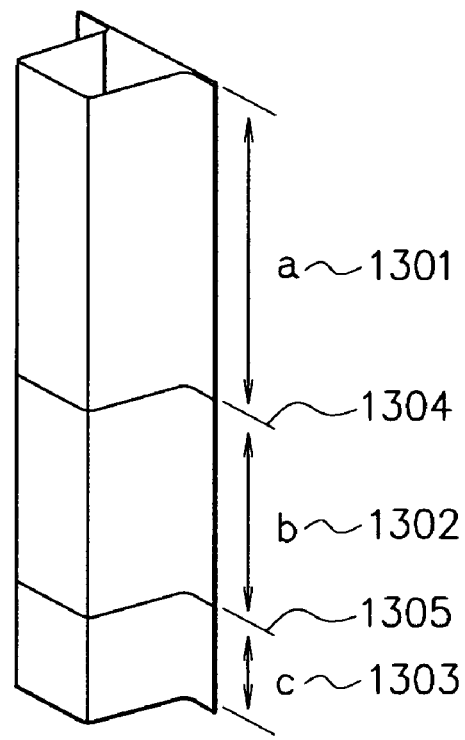
F I G. 14
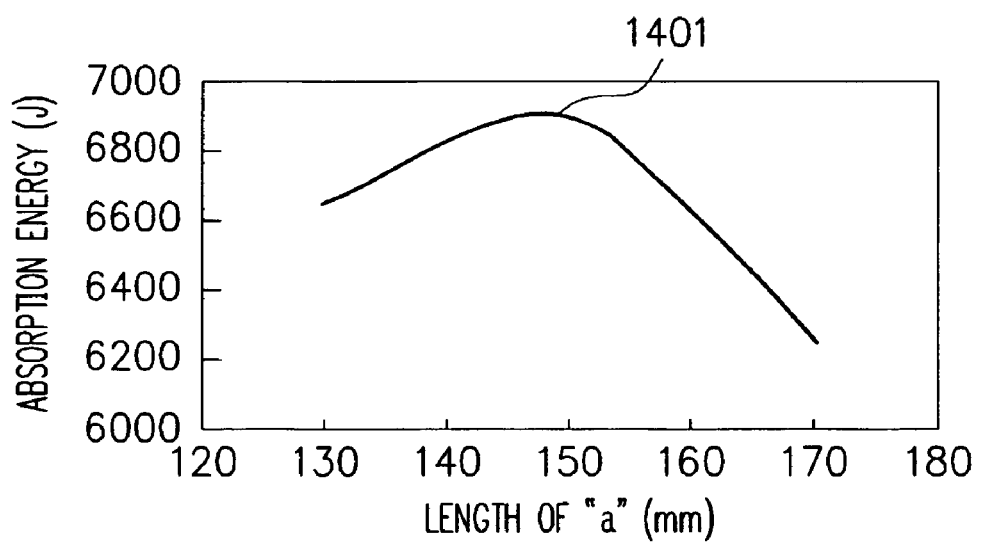

F I G. 17A
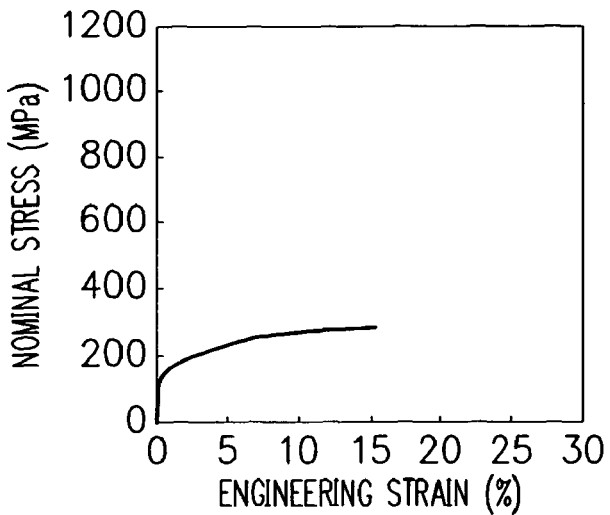
F I G. 17B
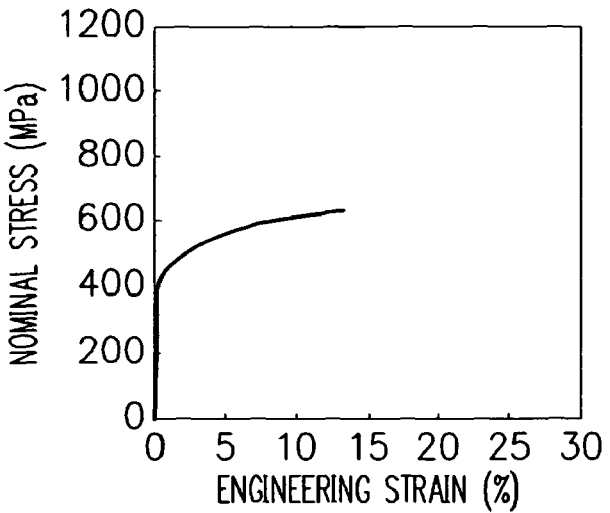
F I G. 17C
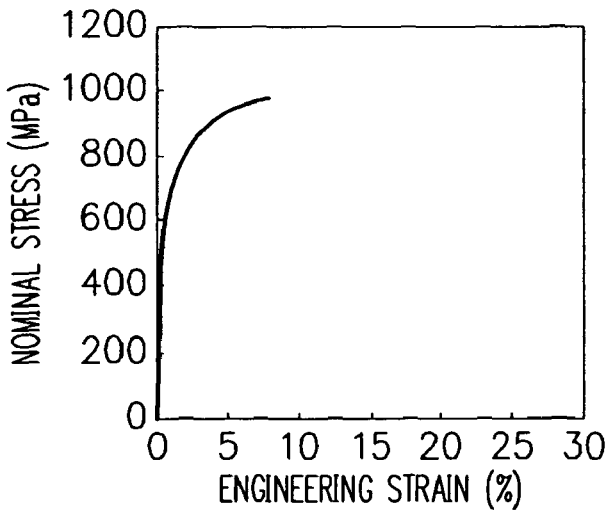

F I G. 19
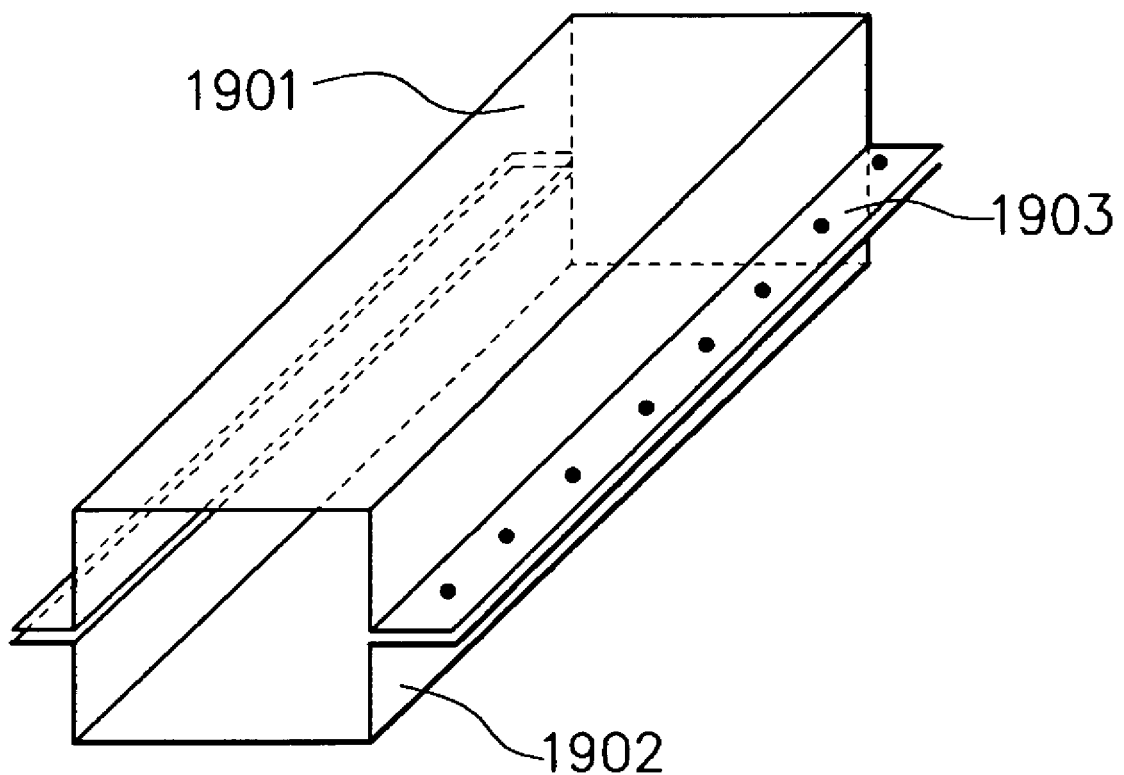

MEMBER DESIGNING METHOD AND APPARATUS

TECHNICAL FIELD

The present invention relates a designing method, a designing apparatus, a computer program product, and a computer-readable recording medium to design a member having superior performance in crash absorbed energy, fatigue life, and so forth.

BACKGROUND ART

In the development of vehicles such as an automobile, in order to cope with the problems such as weight reduction, development period reduction and experimental vehicle manufacture reduction, in recent years, prediction of each performance based on numerical analysis with the use of a computer is frequently performed in designing field.

For instance, as for a crash absorbed energy, in order to absorb crash energy arising when the automobile crashes, a member such as a front side member is designed to cause a regular buckling in the longitudinal direction thereof at the time of the crash to absorb impact energy by plastic deformation by the buckling, so that an occupant of the automobile is protected.

In conventional designing of a crash energy absorption member, after an initial shape of the member is determined, crash analysis is performed such as by finite element method, and a change in shape and so forth is made to the member so that the crash absorbed energy attains a target value. After the evaluation by the analysis has attained the target value, a final confirmation is made by experimental manufacture and experiment, so that the design is determined.

These members are manufactured by performing plastic working to sheets, tubes or bars made of steel or other material and, as appropriate, by joining them. For the plastic working, a forming method such as pressing, hydroforming, or extrusion or the like is adopted. Also, for the joining, a method such as spot welding, arc welding, laser welding, or rivet connection or the like is adopted.

Conventionally, an approach referred to as coupled analysis reaching from press forming to crash analysis shown in FIG. 25 is known, and, in Japanese Patent Application Laid-Open No. 2004-50253 (Patent document 1), there is disclosed a simulation technique, in which, based on the final shape data of a pressed part, an additional shape data is prepared and forming analysis is performed thereafter, and characteristic analysis such as on an ability to withstand a crash force is performed based on the obtained analysis result in a coupled manner. In FIG. 25, "2501" denotes an unprocessed material, "2502" denotes the result of the forming analysis, "2503" denotes the result of the forming analysis after converted into input data for the crash analysis, and "2504" denotes the result of the crash analysis.

However, in Patent document 1, no description is given as to an approach to present an optimum part shape and a forming condition.

It is known that, when a metal such as a steel material is used as a material, a variation in sheet thickness is caused due to plastic working when manufacturing the member and/or work hardening is caused due to the plastic strain, in which the buckling deformation mode and/or crash absorbed energy vari(es) when the member suffers the crash as compared to the case where no sheet thickness variation or working hardening is caused.

Under current condition, since neither sheet thickness variation nor work hardening is taken into consideration at the time of the analysis such as by the finite element method or the like, even if the designing is performed based on the evaluation value obtained by the analysis, desired buckling deformation mode and/or crash absorbed energy cannot be obtained in the experimental manufacture or experiment.

Further, due to a fluctuation in a plastic working condition when manufacturing the member, there arise(s) fluctuation(s) also in sheet thickness variation and/or work hardening, finally causing the fluctuation(s) in the buckling deformation mode and/or crash absorbed energy.

Further, the buckling deformation mode and the crash absorbed energy vary depending on a butt weld line position when using a tailored blank and a joining condition when joining a plurality of members.

Also, as for fatigue strength evaluation for a vehicle, the development needs for an approach allowing accurate and easy prediction of the fatigue life of a part, a member or a structure used for the vehicle aiming limit design are increasing more than ever.

In this field, conventionally, static stress analysis under the condition of a predetermined fatigue load by the finite element method is widely used, and when predicting the fatigue life using the analysis result, an approach; in which an initial shape is determined first and fatigue test data (S-N diagram, E-N diagram) of materials previously used for the member and of the joining portion are obtained, predictive calculation is performed at the same time by cross checking the diagrams, a stress analysis value or a strain analysis value to obtain a predictive life, and then a change is made to the shape of the member, the material, the joining method, or the like so that the calculated fatigue life becomes the target value; is adopted.

After the evaluation by the analysis attains the target value, verification is performed by experimental manufacture and experiment to determine a design specification. These members are manufactured by performing plastic working to sheets, tubes or bars made of steel or other material and, as appropriate, by joining them. For the plastic working, a forming method such as pressing, hydroforming, or extrusion or the like is adopted. Also, for the joining, a method such as spot welding, arc welding, laser welding, or rivet connection or the like is adopted. Recently, fatigue analysis software automatically, which refers to a stress calculation result file obtained by the finite element method as well as fatigue test data of the material previously used for the member and of the joining portion and thereby calculates the life of respective portions, is commercially available.

When a metal such as steel is used as a material, due to the plastic working when forming the member, the sheet thickness variation and plastic strain are caused, and at the same time, when the member is assembled, residual stress due mainly to springback after the formation of the member is caused, and those sheet thickness variation, plastic strain and residual stress are known to largely affect the member in fatigue strength. Further, the calculation method of the residual stress when assembling the member and the quantification method of the fatigue strength variation due to the plastic strain are not clearly defined, making it difficult to build an optimization algorithm for fatigue design of a member to obtain a forming work method satisfying a targeted fatigue life. In the conventional method, effects when forming and assembling those are not taken into consideration, and, on top of that, no optimization algorithm is adopted, so that the fatigue design of the member cannot be performed accurately and speedy, as a matter of fact.

In Japanese Patent Application Laid-Open No. 2001-116664 (Patent document 2), in the analysis method analyzing fatigue strength of a weldment structure composed of plural members, there is disclosed a fatigue strength analysis method evaluating the fatigue strength, in which, based on the shapes and welding methods of the two welded members, in view of a weld line portion, a fatigue strength diagram in the parallel direction to the weld line and a fatigue strength diagram in the vertical direction to the weld line are selected, respectively, and with the stress analysis result of this weldment structure, the stresses in the vertical and parallel directions to the weld line are obtained, and then by comparing these stresses with the fatigue strength diagrams, respectively, to evaluate the fatigue strength.

However, in the method disclosed in Patent document 2, the residual stress arising at each portion after assembling, the plastic strain given when forming the member, and the post-formation sheet thickness distribution are not taken into consideration, and that, the optimization algorithm is not adopted, leaving a problem that the fatigue life prediction cannot be performed accurately and speedy.

In Japanese Patent Application Laid-Open No. 2003-149091 (Patent document 3), a fatigue life evaluation system is disclosed, in which a stress concentration ratio corresponding to a welded shape (finishing process) of a welded portion is recognized beforehand for each joint type by experiment or the like to be stored in a memory together with fatigue life prediction data (S-N diagram) of a front structure, stress of the welded portion is calculated by finite element method analysis, peak stress at an end of the portion welded by bead is calculated by multiplying the stress value by the stress concentration ratio corresponding to the welded shape, and the peak stress is applied to the S-N diagram to predict the fatigue life in accordance with the welded shape.

In Japanese Patent Application Laid-Open No. 2003-149130 (Patent document 4), there is disclosed a method, in which a shell model for a finite element method analysis is prepared with respect to a spot-welded structure composed of sheets fitted together; and linear and elastic analysis by the finite element method is performed using the prepared shell model for the finite element method analysis to calculate a shared load at a nugget portion at a center of the spot welded portion as well as a deflection on and a radial tilt angle of a circle drawn around the nugget portion and having a diameter of D; and then, based on the calculated shared load and the deflection on and radial tilt angle of the circle, nominal structural stress at the nugget portion is obtained using the circular plate bending theory of the elasticity theory to predict the fatigue life of the spot-welded structure using the nominal structural stress.

However, in the methods disclosed in Patent documents 3 and 4, the residual stress arising at each portion after the assembling, the plastic strain given when the member is formed, and post-formation sheet thickness distribution are not taken into consideration, and that, the optimization algorithm is not adopted, leaving a problem that the fatigue design cannot be performed accurately and speedy.

SUMMARY OF THE INVENTION

As has been stated, when the metal such as steel is used as a material, the sheet thickness variation is caused by the plastic working when manufacturing the member and the work hardening is caused by the plastic strain, however, at present, the sheet thickness variation and the work hardening are not taken into consideration at the time of the performance analysis by the finite element method or the like.

An object of the present invention is to enable an optimum member designing to obtain a desired performance including a press forming condition while taking effects of a sheet thickness variation and a work hardening due to a plastic working when manufacturing a member into consideration.

More specifically, an object of the present invention is to enable an optimum member designing to obtain a desired crash performance including a press forming condition while taking effects of a sheet thickness variation and a work hardening due to a plastic working when manufacturing a member into consideration.

Further, an object of the present invention is to enable an optimum member designing including a forming work condition to satisfy a desired fatigue life while taking a sheet thickness variation and a work hardening arising when forming a member as well as a residual stress arising after assembling due mainly to springback after the formation of the member into consideration.

In order to attain the above-described object, a member designing method according to the present invention comprises: a first step where a computer performs press forming analysis based on a shape of a formed product or a shape of a member, a blank holder force, a friction coefficient, a tensile strength of a material, a yield strength, a stress-strain relation, and a sheet thickness, as press forming conditions, to calculate sheet thickness distribution and post-formation strain distribution of the formed product; and a second step where the computer performs performance analysis based on the sheet thickness distribution, the post-formation strain distribution, and the shape of the formed product or the shape of the member, as state amounts of the formed product, to calculate performance of the member, in which the computer repeats the calculations performed in the process from the first step through the second step a predetermined number of times, with at least one of the press forming conditions being changed, to output an optimum press forming condition that gives a maximum value or a target value of the performance.

Further, a member designing apparatus according to the present invention comprises: a press forming condition input part via which a shape of a formed product or a shape of a member, a blank holder force, a friction coefficient, a tensile strength of a material, a yield strength, a stress-strain relation, and a sheet thickness are inputted as press forming conditions into a computer; a press forming analyzer that performs press forming analysis based on the shape of the formed product or the shape of the member, the blank holder force, the friction coefficient, the tensile strength of the material, the yield strength, the stress-strain relation, and the sheet thickness which are inputted via the press forming condition input part, and calculates sheet thickness distribution and post-formation strain distribution of the formed product; a performance analyzer that performs performance analysis of the formed product based on the sheet thickness distribution, the post-formation strain distribution, and the shape of the formed product or the shape of the member, as state amounts, and calculates performance of the member; a repetitive calculation controller that automatically executes the calculations performed in the process from the press forming condition input part through the performance analyzer a predetermined number of times, with at least one of the press forming conditions being changed; and an optimum forming condition output part that outputs an optimum press forming condition that gives a maximum value or a target value of the performance.

Still further, a computer program product according to the present invention comprises: a program code causing a computer to perform press forming analysis based on a shape of a formed product or a shape of a member, a blank holder force, a friction coefficient, a tensile strength of a material, a yield strength, a stress-strain relation, and a sheet thickness, as press forming conditions, and calculate sheet thickness distribution and post-formation strain distribution of the formed product; and a program code for causing the computer to perform performance analysis of the formed product based on the sheet thickness distribution, the post-formation strain distribution, and the shape of the formed product or the shape of the member, as state amounts of the formed product, and calculate performance of the member, in which the computer is caused to repeat the calculations a predetermined number of times, with at least one of the press forming conditions being changed, and to output an optimum press forming condition that gives a maximum value or a target value of the performance.

Furthermore, a computer-readable recording medium according to the present invention records a computer program according to the present invention.

Here, a "formed product" in the present invention is defined as a partly finished product after press forming, and a "member" is defined as the "formed product(s)" assembled, namely, a finished product.

According to the present invention, an optimum member designing to obtain a desired performance including a press forming condition is realized while taking effects of the sheet thickness variation and the work hardening due to the plastic working when manufacturing the member into consideration.

BRIEF DESCRIPTION OF THE DRAWINGS

FIG. 2 is a view showing an appearance of a formed member;

FIG. 4 is a view showing sheet thickness distribution of a forming analysis example;

FIG. 11 is a characteristic view showing a relation between a forming condition and a crash absorbed energy;

FIG. 12 is a characteristic view showing a relation between a forming condition and the crash absorbed energy;

FIG. 13 is a view showing a post-formation shape of a tailored blank member;

FIG. 14 is a characteristic view showing a relation between weld line positions of the tailored blank and the crash absorbed energy;

FIG. 17A is a characteristic view showing a relation between the yield strength/stress-strain relation of a material for a steel plate of a tensile strength of 270 MPa grade;

FIG. 17B is a characteristic view showing a relation between the yield strength/stress-strain relation of a material for a steel plate of a tensile strength of 590 MPa grade;

FIG. 17C is a characteristic view showing a relation between the yield strength/stress-strain relation of a material for a steel plate of a tensile strength of 980 MPa grade;

FIG. 19 is a view showing an example member composed of pressed formed products;

DETAILED DESCRIPTION OF THE PREFERRED EMBODIMENTS

Hereinafter, preferred embodiments according to the present invention will be described with reference to the drawings.

First Embodiment

1. Design Target

Figure 1:
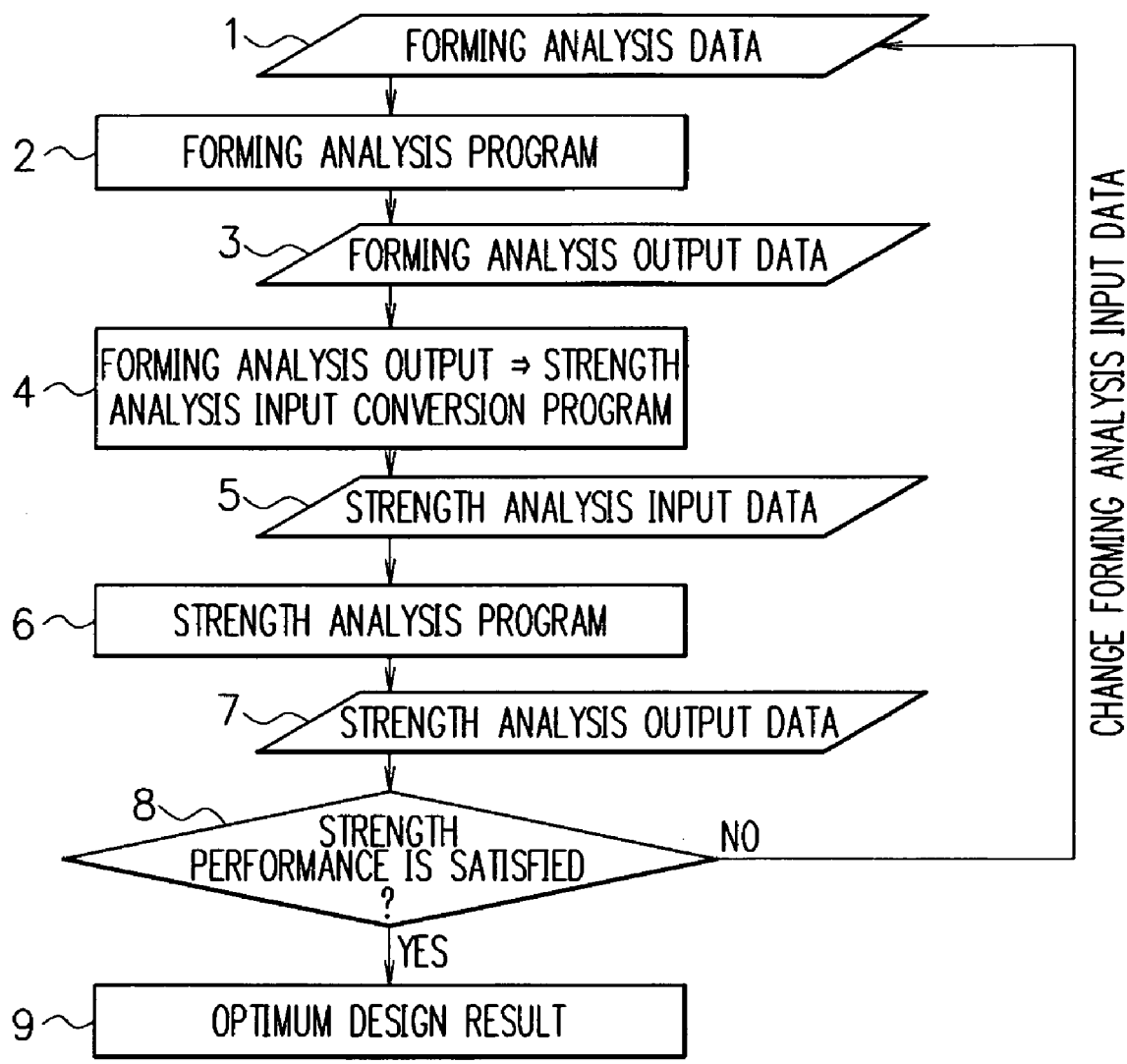
FIG. 1 is a flowchart to explain a member designing flow in a first embodiment.

As an example of the present invention, an optimum forming condition for a panel-type member will be designed. FIG. 1 is a flowchart showing a flow of a member designing method according to a first embodiment. FIG. 2 shows an appearance of a formed member. The panel-type member is formed by pressing. The member receives a local force (hereinafter called a "force") around the center thereof and has a remaining dent after the force is removed. A press forming condition (blank holder force=BHF) is optimized so that the force causing a certain amount of dent, namely a panel strength as a performance of the member is maximized.

The panel-type member has a size of 620 mm in one side, 70 mm in flange width, and 0.7 mm in sheet thickness. The material is a steel plate of a tensile strength of 370 MPa grade.

Figure 3:
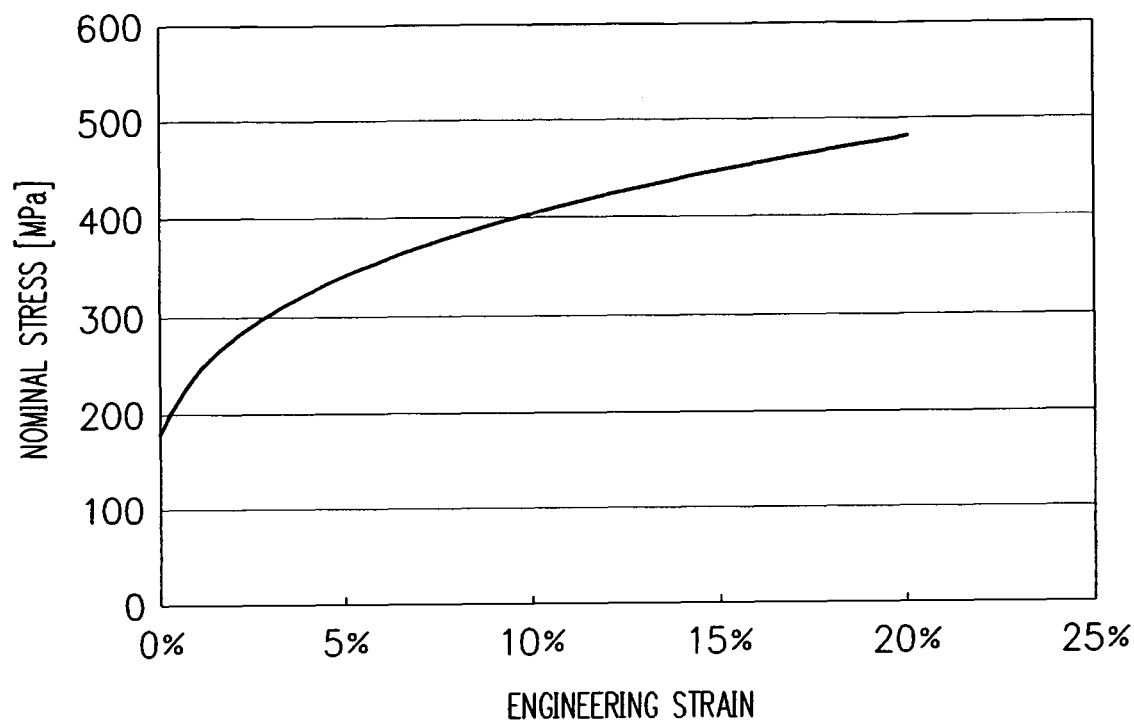
FIG. 3 is a characteristic view showing a yield strength/stress-strain relation of a material.

As the other press forming conditions, a length of stroke is defined as 100 mm, an initial blank holder force (BHF) is defined as 400 kN, a friction coefficient is defined as 0.12, and a yield strength/stress—strain relation of the material is defined as shown in FIG. 3.

2. Forming Analysis

Figure 5:
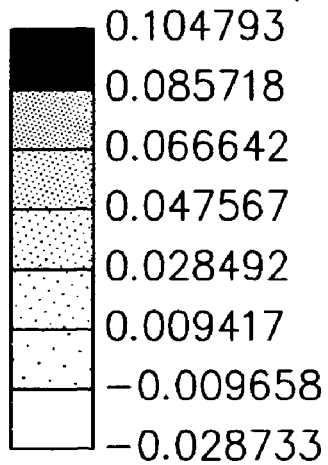
FIG. 5 is a view showing strain distribution of a forming analysis example.
Figure 5:
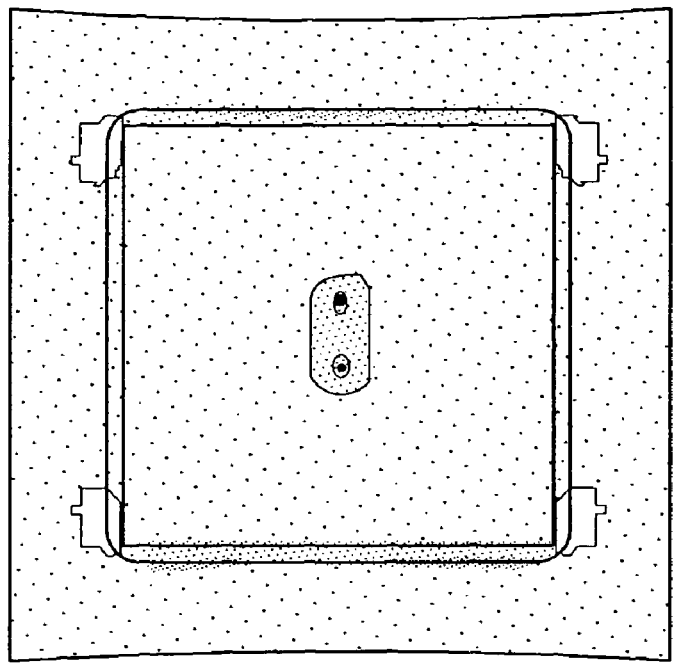

A press forming analysis is performed by inputting the above-described press forming conditions with the use of a finite element analysis program PAM-STAMP. Sheet thickness distribution and strain distribution are shown in FIG. 4 and FIG. 5, respectively.

3. Data Conversion

The analysis result (in the case, for example, of blank holder force BHF=200 kN, the sheet thickness=0.613 mm and the strain=0.07557) of the sheet thickness and the strain by the forming analysis at a reference position 21 shown in FIG. 2 is imported into a spreadsheet software, and then the strain (0.07557) is converted into the stress (375.5 MPa) based on the stress-strain relation in FIG. 3 to be inputted as a strength analysis condition (state amount).

4. Strength Analysis

As a strength analysis method, a formula "Pd=K×t$^m$×σ" (*Puresu Seikei Nan-i Hando Bukku* (Press Formation Difficulty Handbook, in English, as a reference), THE NIKKAN KOGYO SHIMBUN LTD., Tokyo, 1997) calculating the force causing the certain amount of dent (panel strength) in the case where the force is applied to the reference position 21 is used. "K" indicates a constant number determined by the panel shape, "t" indicates the sheet thickness, "m" indicates a multiplier, and "a" indicates the stress calculated based on FIG. 3 using the strain obtained by the forming analysis. Here, it is assumed that K=1.0 and m=2, and the strength analysis is performed using the spreadsheet software. For instance, when the blank holder force BHK=200 kN, then Pd=1.0×0.613$^2$×375.5=141.2.

5. Strength Performance Evaluation and Press Forming Condition Change

Out of the above-described press forming conditions, the blank holder force (BHF) is changed within the range from 200 kN to 800 kN, and the computer performs the calculation from the step 1 to step 7 in FIG. 1 repeatedly four times, so that the optimum press forming condition giving the maximum value of the panel strength is sought.

6. Result

Figure 6:
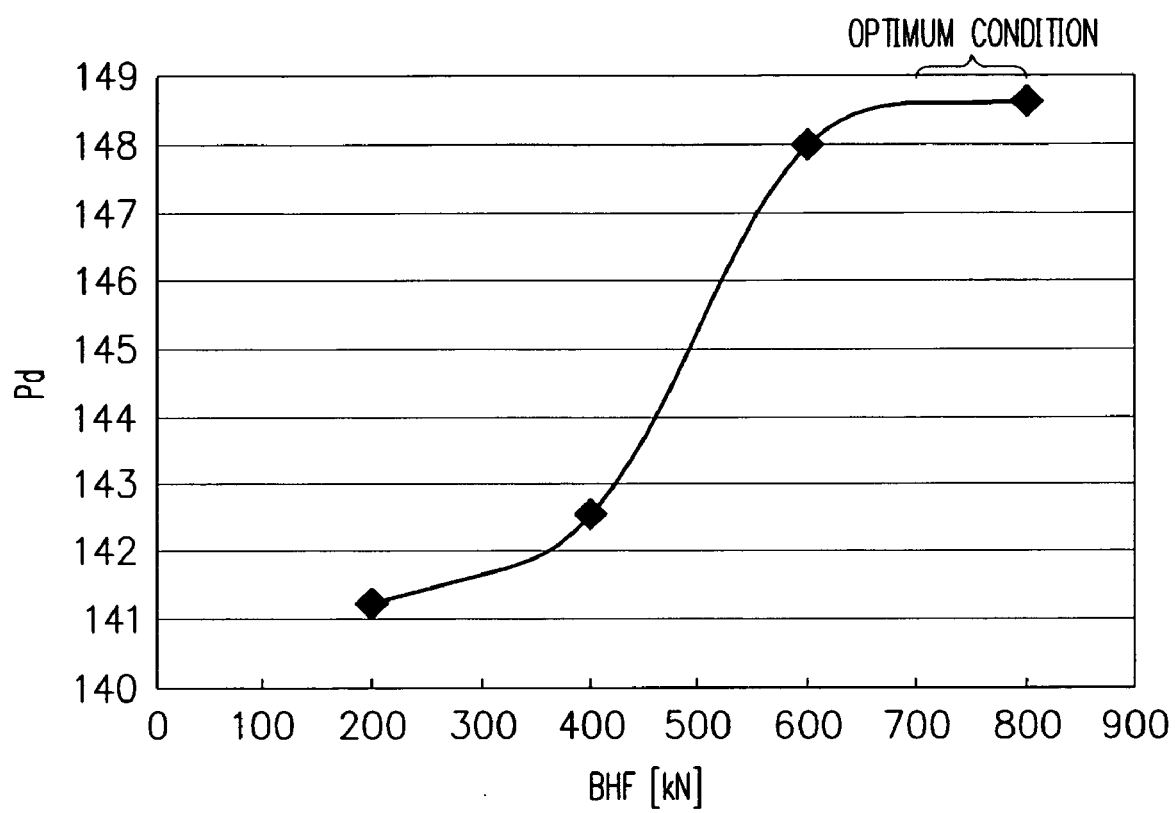
FIG. 6 is a characteristic view showing a relation between a blank holder force and a panel strength.

The result is shown in FIG. 6. In the graph, the horizontal axis indicates the blank holder force (BHF) and the vertical axis indicates the panel strength (Pd). Based on the result, the forming condition in which the panel strength is maximized is when the blank holder force BHF=700 kN to 800 kN and the panel strength is approximately 148.

Second Embodiment

In a second embodiment, the description will be given of a designing of a member being a front side member or the like of an automobile to absorb crash energy arising at the time of an automobile crash.

Figure 7:
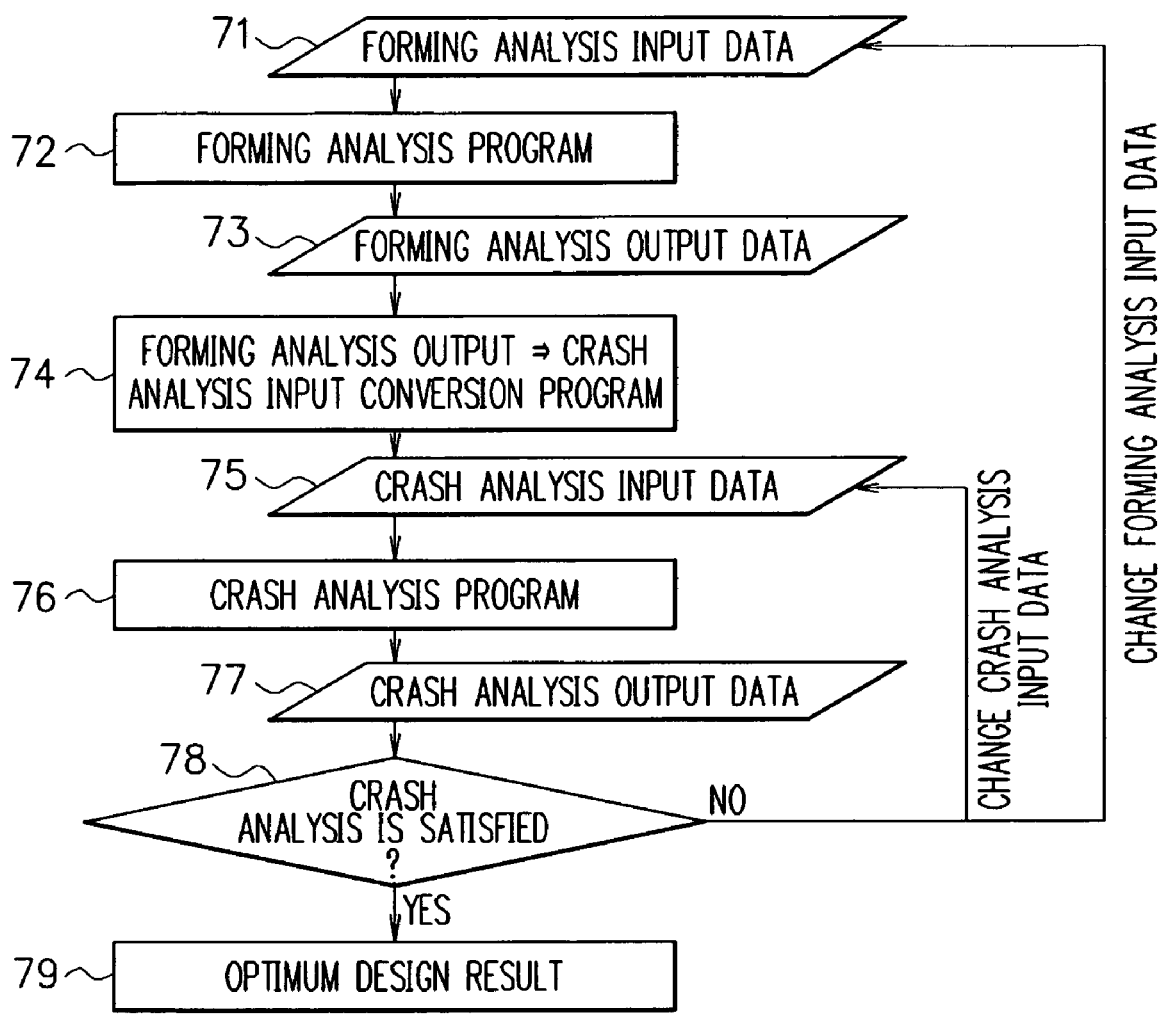
FIG. 7 is a flowchart to explain a member designing flow in a second embodiment.

FIG. 7 is a flowchart to explain the member designing flow in the second embodiment. First, as press forming conditions, respective conditions 71 being the shape of the member, the length of stroke, the blank holder force, a pad pressure, the friction coefficient, a tensile strength of the material, the yield strength, the stress-strain relation, the sheet thickness, and a welded position of the tailored blank are set, and the computer performs the forming analysis (72) by the forming analysis program using the above conditions as input data.

Note that, in the present invention, the pad pressure and the welded position of tailored blank are items to be inputted as required. The tailored blank means a material formed by welded metal plates being different in at least any of the sheet thickness, the tensile strength and the yield strength in the longitudinal direction. With the pad pressure being inputted, effects of avoiding a failure at the time of formation such as a fracture and wrinkle and of giving appropriate work hardening (strain) can be expected. Further, with the input of the welded position of tailored blank, an effect of enhancing later-described performance at the time of the crash obtained by arranging different sheet thicknesses and/or material for the same members can be expected.

Subsequently, based on the press forming conditions 71, the computer performs the press forming analysis (72) to convert output data (sheet thickness distribution, strain distribution and stress distribution) 73 of the forming analysis into input data 75 for crash analysis by conversion program (74).

Note that, in the present invention, the stress distribution of the formed product is an item to be outputted if required as a result of the forming analysis. By outputting the stress distribution of the formed product and by performing the following crash analysis based thereon, an effect of performing a highly precise designing, in which deformation and/or destruction phenomenon(s) at the time of the crash is (are) truly duplicated, can be expected.

Subsequently, based on the sheet thickness distribution, the strain distribution, the stress distribution, the shape of the member, the joining condition of member and an impact force of the formed product, as crash analysis conditions 75, the computer performs the crash analysis (76) by a crash analysis program to output output data (crash absorbed energy and buckling deformation mode) 77 of the crash analysis, and evaluates them (78).

Note that, in the present invention, out of the crash analysis conditions, the stress distribution of the formed product is an item to be inputted if required as described before. Also, the joining condition of the member is the item to be inputted into the crash analysis conditions if required. The joining conditions are, specifically, one kind or two kinds or more of the welding method, a heat input, a preheat temperature, a number of spot welding(s), a nugget diameter, the welded position, and the like. With the joining conditions of the member being inputted into the crash analysis conditions, effects of making the buckling deformation mode at the time of the crash be a desired mode and maximizing the crash absorbed energy can be expected.

In the crash analysis, calculations are performed to obtain the crash absorbed energy and the deformation mode. The deformation mode means a deforming mode when the member receives an impact to be deformed. Specifically, a deformation mode in which the member is folded in an accordion manner or a deformation mode in which the member is bent in the middle thereof is caused.

When the crash performance does not attain the desired value or when step 71 to step 77 are not yet repeated predetermined number of times, at least, one kind or more of the press forming conditions 71 or the joining condition of the member out of the crash analysis conditions 75 is (are) changed, and the computer performs the calculations by repeating the step 71 to step 77 predetermined number of times. The process stops when the crash performance attains the desired value by repeating step 71 to step 77. The predetermined number of times is preferably 10 times or more to seek for the maximum point of the crash absorbed energy. Meanwhile, in order to save the time of a series of analysis, 100 times or less is preferable.

With this, an optimum design result 79 giving the maximum value or a stable region of the crash absorbed energy can be obtained.

Note that the forming analysis and the crash analysis may be performed by a commercially available analysis program by the finite element method or the like or a self-developed program. Also, the data conversion from the forming analysis to the crash analysis, the crash performance evaluation and the change in shape and/or processing conditions are performed by the commercially available program or the self-developed program as well.

As stated above, the optimum member can be designed by making the buckling deformation mode and/or the crash absorbed energy when the automobile crashes be the desired value(s) and by seeking for a design point (shape of member, press forming condition and so on) in which the crash performance does not vary largely even if there is a fluctuation in the processing conditions when manufacturing the member, while taking the effects of the sheet thickness variation and the work hardening when manufacturing the member into consideration.

EXAMPLE 1

1. Design Target

As an example 1 of the second embodiment, optimum forming conditions for a member formed by spot welding a closing plate to a member having a hat-shape section are designed. FIG. 13 shows an appearance of the formed member. The member having the hat-shape section is formed by pressing. The member is assumed to be crashed around the axis in the longitudinal direction when receiving an impact force, and a press work condition (blank holder force=BHF) is optimized so that the crash absorbed energy at that time is maximized.

The size of the member having the hat-shape section is 300 mm in length, 50 mm in cross-sectional width, 50 mm in cross-sectional height, 20 mm in flange width and 1.4 mm in sheet thickness. The size of the closing plate is 300 mm in length, 90 mm in width and 1.4 mm in sheet thickness. The material is a high-tensile steel plate of 590 MPa grade for both the member having the hat-shape section and closing plate.

As the other press forming conditions, the length of stroke is defined as 50 mm, the initial blank holder force (BHF) is defined as 40 kN, the friction coefficient is defined as 0.15, and the yield strength/stress—strain relation of the material is defined as shown in FIG. 17B.

2. Forming Analysis

Figure 8:
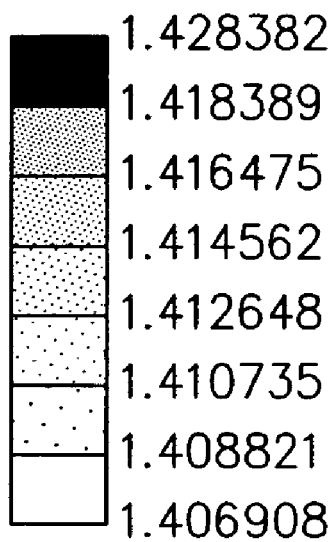
FIG. 8 is a view showing sheet thickness distribution of a forming analysis example.
Figure 8:
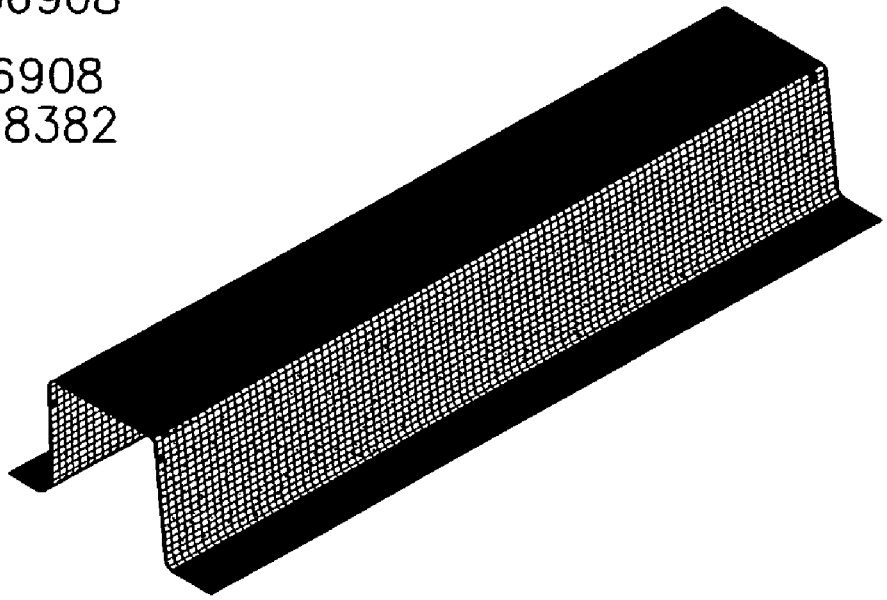
Figure 9:
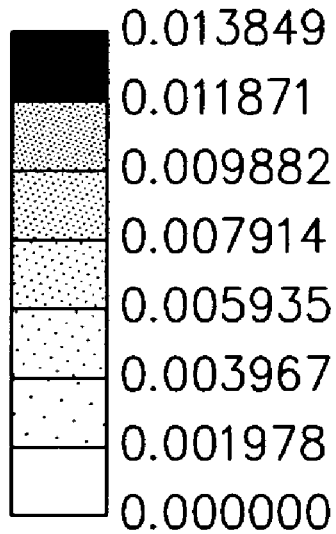
FIG. 9 is a view showing strain distribution of a forming analysis example.
Figure 9:
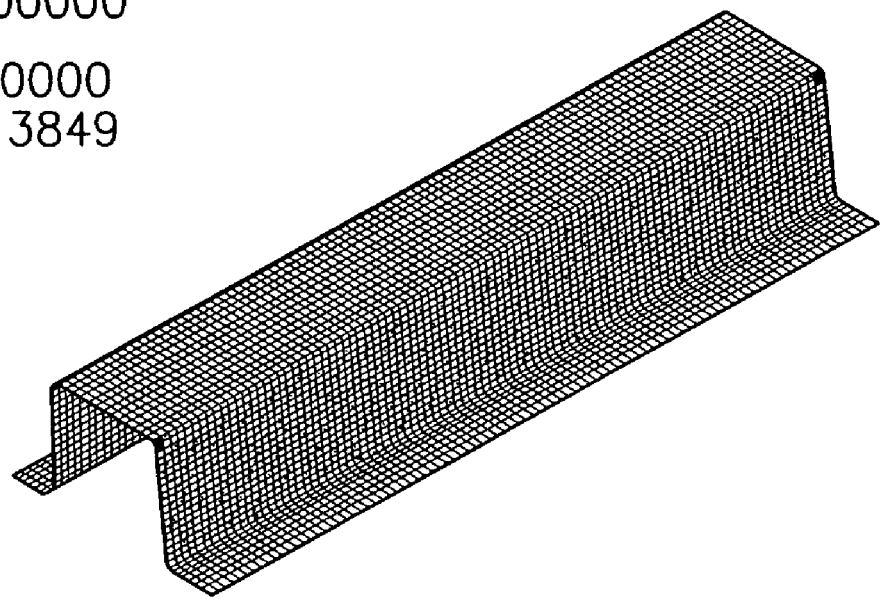

The above-described press forming conditions are inputted and then the press forming analysis is performed using a commercially available finite element analysis program "Hyper Form" to calculate the sheet thickness distribution shown in FIG. 8 and the strain distribution of the formed product shown in FIG. 9.

3. Data Conversion

The analysis result of the sheet thickness variation and the strain distribution by the forming analysis are converted into the input data for the crash analysis using a self-developed FORTRAN program, and the sheet thickness distribution, the strain distribution and the shape of the member of the formed product are inputted as crash analysis conditions.

4. Crash Analysis

Figure 10A:
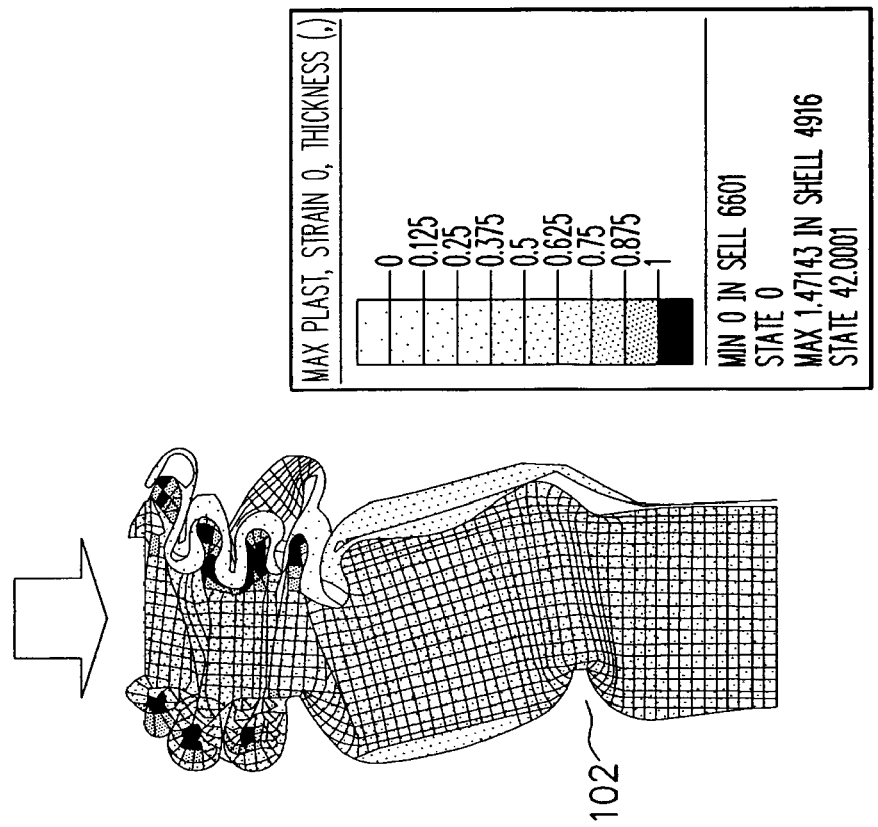
FIG. 10A is a view showing a crash analysis example and a good buckling deformation mode.
Figure 10B:
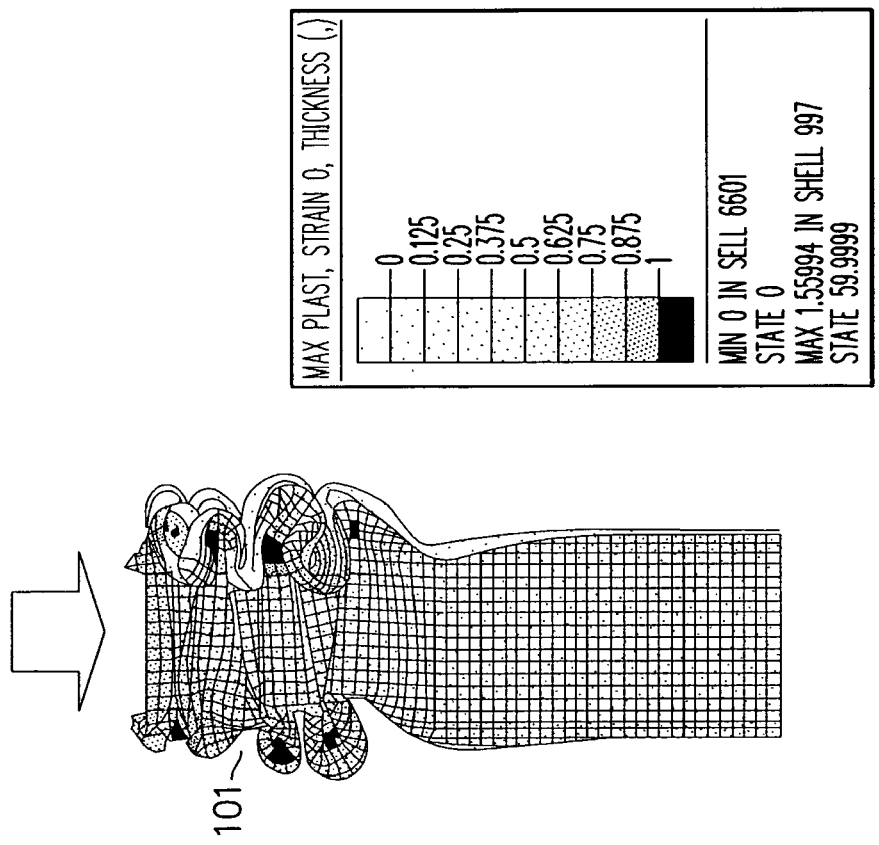
FIG. 10B is a view showing the crash analysis example and a bad buckling deformation mode.

As a crash analysis condition, further, the impact force equal to that in the case where a steel of 553.6 kg mass is crashed at a speed of 6.26 m/sec is inputted, and the crash analysis is performed using a commercially available finite element analysis program "PAM-CRASH". As shown in FIGS. 10A and 10B, the crash absorbed energy and the deformation mode are calculated including the case where the press forming condition is changed as will be described later. FIG. 10A shows a good buckling deformation mode in which a regular buckling deformation 101 is repeated in the axial direction and FIG. 10B shows a bad buckling deformation mode in which an irregular buckling deformation 102 is caused.

5. Crash Performance Evaluation and Processing Condition Change

A commercially available optimization tool "iSIGHT" is used. In order to maximize and stabilize the crash absorbed energy, out of the above-described press forming conditions, the blank holder force (BHF) is changed within the range from 1 kN to 350 kN, then the computer performs calculation from the step 71 to step 77 in FIG. 7 repeatedly 70 times, and the optimum press forming condition giving the maximum value or the stable region of the crash absorbed energy is sought.

6. Result

The result is shown in FIG. 11. In the graph, the horizontal axis indicates the blank holder force (BHF) and the vertical axis indicates the crash absorbed energy. Based on the result, a point 111 at which the crash absorbed energy is maximized is when the blank holder force BHF=298 kN, where the crash absorbed energy is 8044 J. However, under these conditions, if the blank holder force BHF fluctuates, the crash absorbed energy varies sharply, therefore, when highly-precise press control is difficult, it is difficult to adopt the point as the optimum design point.

At that time, there is a range where the blank holder force BHF=200 kN to 250 kN as a range 112 in which the crash absorbed energy is stabilized at higher level, so that it is found that the midpoint thereof can be adopted as the optimum design point.

Further, under the same conditions as of example 1, when further performing the press forming analysis, the stress distribution of the formed product is calculated (view of the stress distribution is omitted here), then the crash analysis is performed by including this stress distribution, and the above-described repetitive calculations are performed 25 times while changing the blank holder force, as a result, there exists a range where the blank holder force BHF=220 kN to 260 kN, so that it is found that the midpoint thereof can be adopted as the optimum design point.

EXAMPLE 2

1. Design Target

As an example 2 of the second embodiment, optimum forming conditions for a member formed by spot welding the closing plate to the member having the hat-shape section are designed. The member having the hat-shape section is formed by pressing. The member is assumed to be crashed around the axis in the longitudinal direction by receiving an impact force, and the press work condition (pad pressure) is optimized so that the crash absorbed energy at that time is maximized.

The size of the member having the hat-shape section is 300 mm in length, 50 mm in cross-sectional width, 50 mm in cross-sectional height, 20 mm in flange width and 1.4 mm in sheet thickness. The size of the closing plate is 300 mm in length, 90 mm in width and 1.4 mm in sheet thickness. The material is a high-tensile steel plate of 590 MPa grade for both the member having the hat-shape section and closing plate.

As the other press forming conditions, the length of stroke is defined as 50 mm, the initial blank holder force (BHF) is defined as 200 kN, an initial pad pressure is defined as 1 kN, the friction coefficient is defined as 0.15, and the yield strength/stress—strain relation of the material is defined as shown in FIG. 17B.

2. Forming Analysis

The above-described press forming conditions are inputted and then the press forming analysis using the commercially available finite element analysis program "PAM-STAMP" is performed to calculate the sheet thickness distribution of the formed product similar to that shown FIG. 8 and the strain distribution similar to that shown in FIG. 9 (drawing is omitted here).

3. Data Conversion

The analysis result of the sheet thickness variation and the strain distribution in the forming analysis are converted into the input data by using self-developed FORTRAN program, and the sheet thickness distribution, the strain distribution and the shape of the member for the formed product are inputted as the crash analysis conditions.

4. Crash Analysis

As a crash analysis condition, further, the impact force equal to that in the case where a steel of 553.6 kg mass is crashed at a speed of 6.26 m/sec is inputted, and the crash analysis is performed using the commercially available finite element analysis program "PAM-CRASH". Including a later-described case where the pad pressure condition is changed, the same results as shown in the drawings in FIGS. 10A and 10B are obtained (drawings are omitted here). When the pad pressure is 18 kN or more, the buckling deformation mode such that the member is bent is shown.

5. Crash Performance Evaluation and Processing Condition Change

The commercially available optimization tool "iSIGHT" is used. In order to maximize and stabilize the crash absorbed energy, out of the above-described press forming conditions, the pad pressure is changed within the range from 1 kN to 25 kN, then the computer performs calculation from the step 71 to step 77 in FIG. 1 repeatedly 13 times, and the optimum press forming condition giving the maximum value or the stable region of the crash absorbed energy is sought.

6. Result

The result is shown in FIG. 12. In the graph, the horizontal axis indicates the pad pressure and the vertical axis indicates the crash absorbed energy. Based on the result, a point 1201 at which the crash absorbed energy is maximized is when the pad pressure=16 kN, where the crash absorbed energy is 8300 J.

EXAMPLE 3

1. Design target

As an example 3 of the second embodiment, optimum forming conditions for a member formed by spot welding the closing plate to the member having the hat-shape section are designed. The member having the hat-shape section is formed by pressing a tailored blank material. The member is assumed to be crashed around the axis in the longitudinal direction by receiving the impact force, and the press work condition (weld position of the tailored blank) is optimized so that the crash absorbed energy at that time is maximized.

The size of the member having the hat-shape section is 300 mm in length, 50 mm in cross-sectional width, 50 mm in cross-sectional height, 20 mm in flange width and 1.2 mm in sheet thickness. The size of the closing plate is 300 mm in length, 90 mm in width and 1.2 mm in sheet thickness. The materials for the member having the hat-shape section are steel plates of 270 MPa grade, 980 MPa grade and 590 MPa grade from the above, respectively, and that for the closing plate is a steel plate of 590 MPa grade. FIG. 13 shows an appearance of the member having the hat-shape section.

As the other press forming conditions, the length of stroke is defined as 50 mm, the blank holder force (BHF) is defined as 10 kN, and the friction coefficient is defined as 0.15. The yield/stress—strain relations of the materials are shown in FIGS. 17A, 17B, 17C for the materials of 270 MPa grade, 590 MPa grade, 980 MPa grade, respectively.

2. Forming Analysis

The above-described press forming conditions are inputted and then the press forming analysis is performed using a commercially available finite element analysis program "Hyper-Form" to calculate the sheet thickness distribution of the formed product similar to that shown FIG. 8 and the strain distribution similar to that shown in FIG. 9 (drawing is omitted here).

3. Data Conversion

The analysis result of the sheet thickness variation and the strain distribution by the forming analysis are converted into the input data for the crash analysis using the self-developed FORTRAN program, and the sheet thickness distribution, the strain distribution and the shape of the member of the formed product are inputted as crash analysis conditions.

4. Crash Analysis

As a crash analysis condition, further, the impact force equal to that in the case where a steel of 500 kg mass is crashed at a speed of 6 m/sec is inputted, and the crash analysis is performed using the commercially available finite element analysis program "PAM-CRASH". Including a later-described case where the weld position of the tailored blank is changed, the same results as shown in the drawings in FIGS. 10A and 10B are obtained (drawings are omitted here). When the weld position of the tailored blank is "a">160 mm, a buckle deformation mode, in which "c" region of 590 MPa grade steel is not folded in good condition, is shown.

5. Crash Performance Evaluation and Processing Condition Change

The commercially available optimization tool "iSIGHT" is used. In order to maximize and stabilize the crash absorbed energy, out of the above-described press forming conditions, a weld position 1304 of the tailored blank shown in FIG. 13 is changed within the range from "a"=130 mm to 170 mm, then the computer performs calculations from the step 71 to step 77 in FIG. 1 repeatedly 50 times, and the optimum press forming condition giving the maximum value of the crash absorbed energy is sought. Note that a length 1302 at a center portion is fixed to be "b"=100 mm, and a length 1303 at a lower portion is defined to be "c"=(300−a−b) mm.

6. Result

The result is shown in FIG. 14. In the graph, the horizontal axis indicates the weld position of the tailored blank and the vertical axis indicates the crash absorbed energy. Based on the result, a point 1401 at which the crash absorbed energy is maximized is when the weld position of the tailored blank "a"=148 mm, where the crash absorbed energy is 6900 J.

EXAMPLE 4

1. Design Target

As an example 4 of the second embodiment, optimum forming conditions for a member formed by spot welding the closing plate to the member having the hat-shape section are designed. The member having the hat-shape section is formed by pressing a steel plate. The member is assumed to be crashed around the axis in the longitudinal direction by receiving the impact force, and the joining condition is optimized so that the crash absorbed energy at that time is maximized. Specifically, as for the spot welding of the flange of the member having the hat-shape section and the closing plate, the number of the weldings and the nugget diameter are optimized.

The size of the member having the hat-shape section is 300 mm in length, 50 mm in cross-sectional width, 50 mm in cross-sectional height, 20 mm in flange width and 1.4 mm in sheet thickness. The size of the closing plate is 300 mm in length, 90 mm in width and 1.4 mm in sheet thickness. The material is the high-tensile steel plate of 590 MPa grade.

As the other press forming conditions, the length of stroke is defined as 50 mm, the blank holder force (BHF) is defined as 34 kN, and the friction coefficient is defined as 0.15. The yield strength/stress—strain relation of the material is defined as shown in FIG. 17B.

2. Forming Analysis

The above-described press forming conditions are inputted and then the press forming analysis is performed using the commercially available finite element analysis program "Hyper-Form" to calculate the sheet thickness distribution of the formed product similar to that shown FIG. 8 and the strain distribution similar to that shown in FIG. 9 (drawing is omitted here).

3. Data Conversion

The analysis result of the sheet thickness distribution and the strain distribution by the forming analysis are converted into the input data for the crash analysis using a self-developed FORTRAN program, and the sheet thickness distribution, the strain distribution and the shape of the member of the formed product are inputted as crash analysis conditions.

4. Crash Analysis

As a crash analysis condition, further, the impact force equal to that in the case where a steel of 553.6 kg mass is crashed at a speed of 6.26 m/sec is inputted, and the crash analysis is performed using the commercially available finite element analysis program "PAM-CRASH". Including a later-described case where the number of welding(s) of the spot welding and the nugget diameter are changed, the same results as shown in the drawings in FIGS. 10A and 10B are obtained (drawings are omitted here). When the number of the weldings of the spot welding is seven and the nugget diameter is 7 mm, the buckling deformation mode such that the member is folded in an accordion manner, and when the number of the weldings and the nugget diameter are other than the above, the buckling deformation mode such that the member is bent at the midpoint thereof is shown.

5. Crash Performance Evaluation and Processing Condition Change

Figure 15:
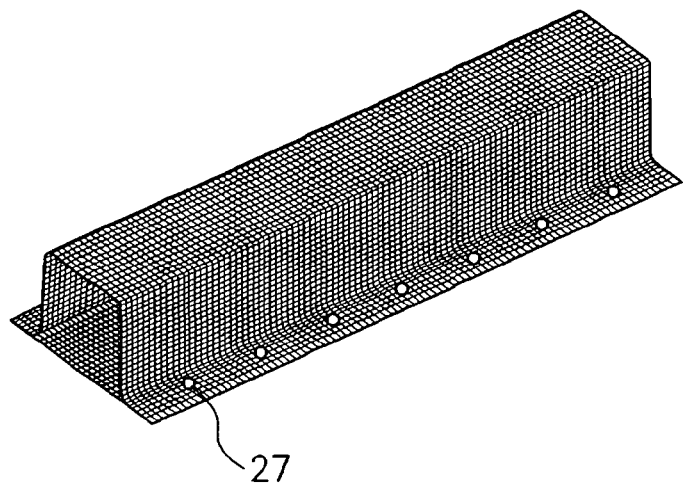
FIG. 15 is a view showing spot welded positions.

The commercially available optimization tool "iSIGHT" is used. In order to maximize and stabilize the crash absorbed energy, out of the member joining conditions, the number of spot welding(s) is changed within the range from 3 to 10 for one side as shown in FIG. 15 and the nugget diameter of the spot welding is changed within the range from 3 mm to 10 mm, and then the computer calculates the step 71 to step 77 in FIG. 1 repeatedly 16 times, so that the optimum press forming condition or the optimum joining condition giving the maximum value of the crashed absorbed energy is sought.

6. Result

Figure 16:
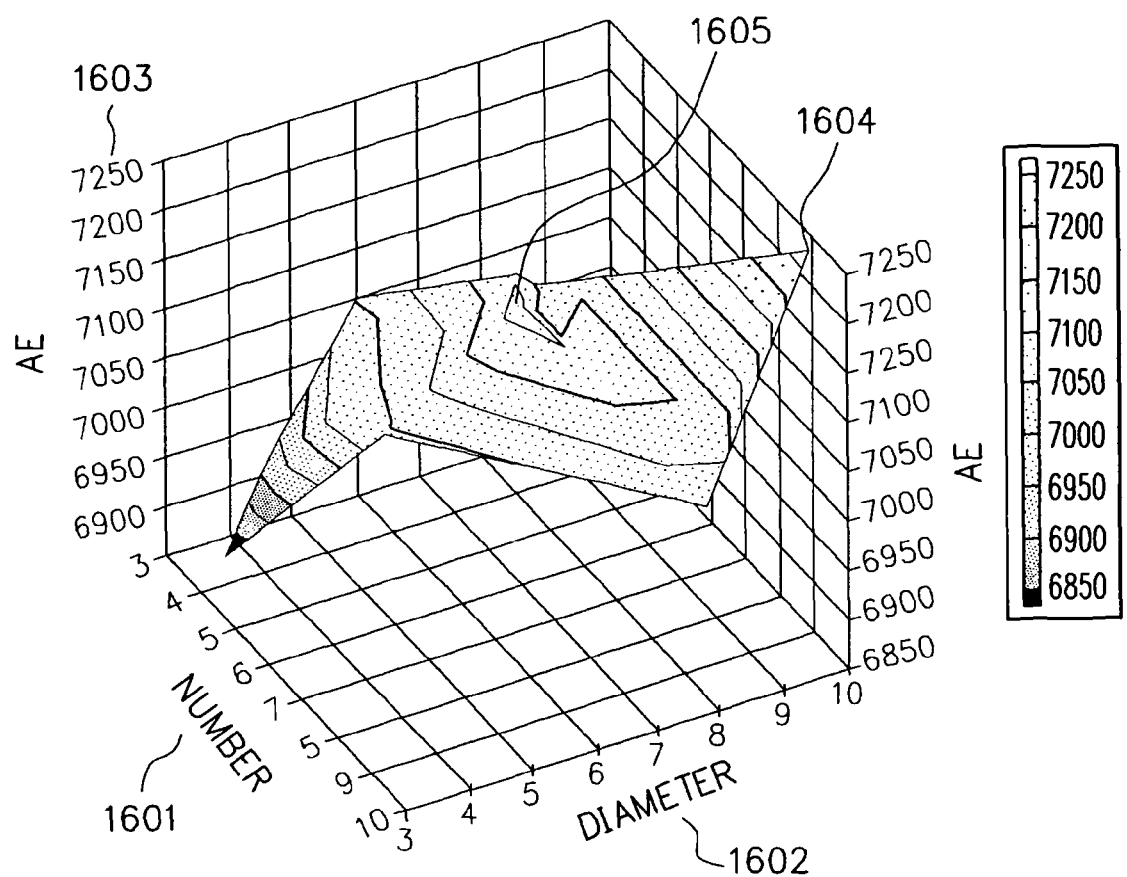
FIG. 16 is a characteristic view showing a relation between joining conditions and the crash absorbed energy.

The result is shown in FIG. 16. In the graph, a horizontal axis 1601 indicates the number of spot weldings, a horizontal axis 1602 indicates the nugget diameter, and a vertical axis 1603 indicates the crash absorbed energy. Based on the result, a point 1604 at which the crash absorbed energy is maximized is when the number of spot weldings is nine and the nugget diameter is 10 mm, where the crash absorbed energy is 7237 J. Further, when the number of spot weldings is seven and the nugget diameter is 7 mm, there is a maximum point 1605 showing a crash absorbed energy of 7125J, and this can considered to be a candidate of the optimum design point in consideration of the spot welding cost.

Further, in the case where the above-described optimum joining conditions are given, and, as a press forming condition, the blank holder force is changed and the above-described repetitive calculations are performed 13 times, the crash absorbed energy is stabilized at high level when the blank holder force BHF=200 kN to 250 kN, and it is found that the middle point thereof can be adopted as the optimum design point.

Third Embodiment

In a third embodiment, a part, a member or a structure used in a vehicle, especially an industrial vehicle such as an automobile, an agricultural vehicle and the like is predicted in view of fatigue life against cyclic load arising when driving the vehicle, and a designing of optimum press forming conditions giving a maximum value of the fatigue life or a target fatigue life will be described.

With reference to the flowchart in FIG. 18, a member designing flow according to the third embodiment will be described. First, as the press forming conditions, respective input data 1801 being the shape of a material before forming, the shape of the formed product, a tool shape, the length of stroke, the blank holder force, the friction coefficient, the tensile strength of the material, the yield strength, the stress-strain relation and sheet thickness are set, and the computer performs the press forming analysis (1802) by the forming analysis program using the above conditions as input data.

Based on the input data 1801 of the press forming conditions, the computer performs the press forming analysis (1802), and outputs the sheet thickness, the post-formation stress distribution and the post-formation strain distribution of the formed product as output data 1803 of the press forming analysis.

Subsequently, the sheet thickness distribution, the post-formation stress distribution and the shape of the member out of the output data 1803 of the press forming analysis are set as input data 1804 of the springback analysis conditions, and the computer performs the springback analysis (1806) using the springback analysis program based on the input data 1804 to output a residual stress distribution of the member as output data 1808 of the springback analysis.

Also, in parallel therewith, out of the output data 1803 of the press forming analysis, the sheet thickness distribution, the shape of the member, and the static load are set as input data 1805 for the elastic analysis conditions, and the computer performs the elastic analysis (1807) on the member based on the input data 1805 using an elastic analysis program to output the post-elastic formation stress distribution and the post-elastic deformation strain distribution as output data 1809 of the elastic analysis.

Subsequently, the post-formation strain distribution out of the output data 1803 of the press forming analysis, a residual stress distribution of the output data 1808 of the springback analysis, and the post-elastic deformation stress distribution and the post-elastic deformation strain distribution out of the output data 1809 of the elastic analysis, and a fatigue load are set as condition input data 1810 for a fatigue analysis, and the computer performs the fatigue analysis (1811) based on the input data 1810 using the fatigue analysis program to output the fatigue life of the member as output data 1812 of the fatigue analysis and evaluate whether or not the fatigue life satisfies the target life or whether or not the fatigue life is the maximum value (1813).

When the fatigue life of the member does not attain a desired value, at least one kind or more of the input data 1801 of the press forming conditions is/are changed and the computer calculates again from step 1801 to step 1812 repeatedly a predetermined number of times.

When the fatigue life of the member has attained the desired value by repeating step 1801 to step 1812, the process is stopped.

With this, it is possible to obtain the optimum press forming conditions 1814 giving the maximum value of the fatigue life or the target life.

Note that for the press forming analysis, the springback analysis, the static elastic analysis and the fatigue life analysis, a commercially available analysis program by the finite element method or the like or a self-developed program can be used. As a press forming analysis program or a springback analysis program, there are commercially available solvers such as the PAM-STAMP, a LS-DYNA, an ABAQUS and the like, and as those for the elastic analysis, there are commercially available solvers using the finite element method such as a NASTRAN, a MARC, the ABAQUS and the like. As a fatigue life analysis program, there is commercially available software such as a MSC. Fatigue, a FEMFAT, a FE-Fatigue or the like. Further, the data transfer to/from the press forming analysis result or the springback analysis result to/from the fatigue life analysis, and an analysis condition change are performed using a commercially available program or a self-developed program. As an optimization tool automatically changing the analysis condition and performing repetitive calculation to obtain the optimum result, commercially available optimization software iSIGHT, OPTIMUS, AMDESS and the like are prepared, so that the repetitive calculation shown in FIG. 18 can be automated.

The input data 1804, 1805, 1810 may be inputted from an external input part in each case or may be imported automatically in the program.

Figure 20:
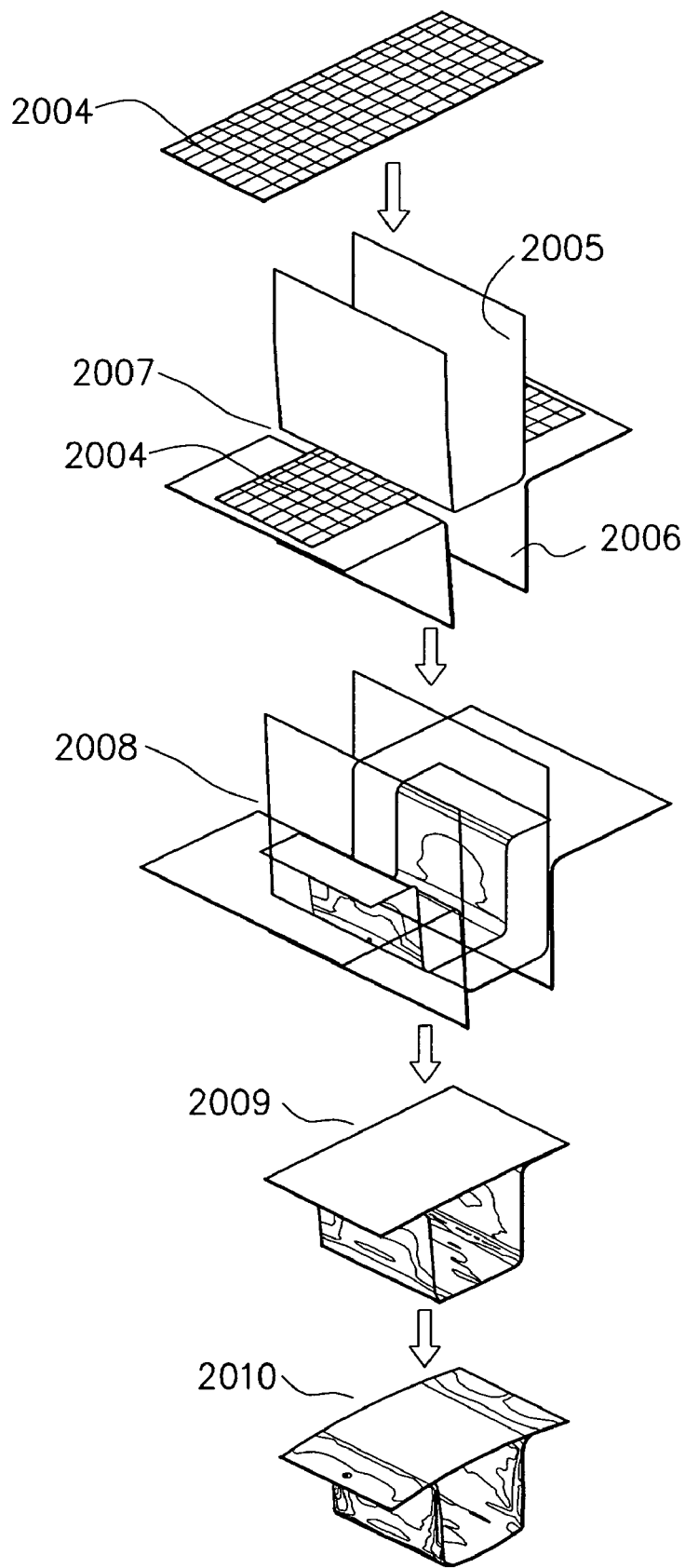
FIG. 20 is a view showing example calculation procedures to obtain residual stress distribution.

FIG. 19 shows an example member formed by two press formed products 1901, 1902 assembled by spot weldings 1903. Further, in FIG. 20, example calculation procedures (corresponding to 1801, 1802, 1803, 1804, 1806, 1808 in FIG. 18) to obtain the residual stress distribution of the member, in which the press forming analysis of the formed product and the springback analysis of the member are performed, are shown. Based on shape data 2004 of the material before forming and shape data of tools (punch mold 2005, die mold 2006), a finite element mesh model 2007 is generated, and a press forming analysis 2008 is performed based on the press forming conditions to obtain the sheet thickness distribution at a dead point after formed, the post-formation stress distribution and the post-formation strain distribution.

Using the formed product, in which the sheet thickness distribution and the post-formation stress distribution obtained in the press forming analysis 2008 are mapped, member assembling 2009 is performed on the computer and then springback analysis 2010 is performed, so that the residual stress distribution of the member is obtained. As for the calculation of the residual stress distribution, it is possible to obtain the residual stress generated at a jointed portion or a metal material portion, after performing the springback analysis on the formed product, jointing the formed products on the computer, and assembling the member.

Figure 21A:
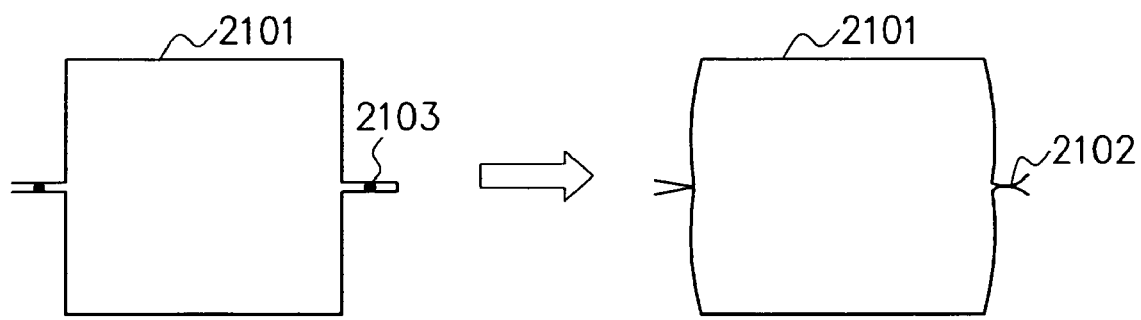
FIG. 21A is a view showing an example to obtain the residual stress distribution by performing springback analysis after assembling the formed products into the member.
Figure 21B:
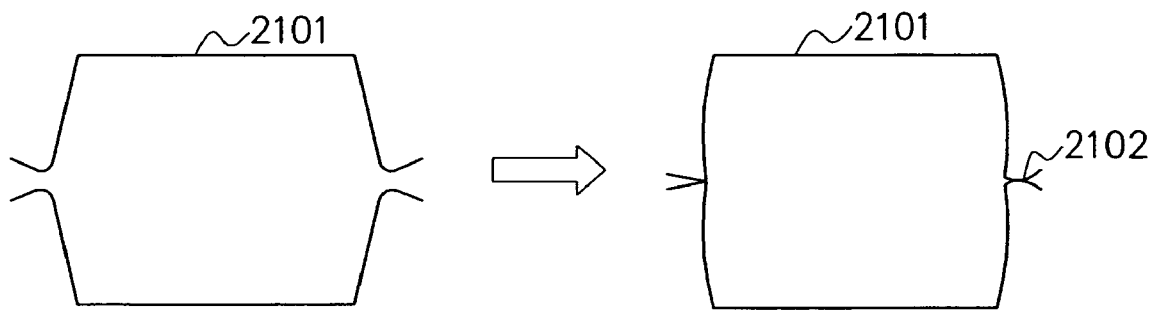
FIG. 21B is a view showing an example to obtain the residual stress distribution by assembling the formed products into the member after performing the sprinback analysis to the formed products.

FIGS. 21A and 21B show two types of the above-described processes in which the formed products are assembled to obtain the residual stress. FIG. 21A shows an example, in which two formed products 2101 each having the hat-shape section are assembled into a member by a spot welding 2103 to obtain the residual stress distribution by performing the springback analysis, and FIG. 21B shows an example, in which the springback analysis is performed on the formed products each having the hat-shape section, displacement distributions by the springback are calculated, deformed shapes of the formed products are obtained, and they are assembled into the member based on the deformed shapes by a spot welding 2102 to obtain the residual stress distribution.

Subsequently, an example fatigue life calculation considering the post-formation strain distribution and performed in the fatigue life analysis program 1811 will be shown. The post-formation strain distribution obtained by the press forming analysis is set as the prestrain distribution of the member and the S-N diagram and the E-N diagram are selected based on the value to perform the fatigue life calculation. Here, the E-N diagram indicates the fatigue life diagram showing a relation between the strain value and the number of cycles. For the S-N diagram and E-N diagram, it is possible to use commercially available data or data in publicly known document, and it is also possible to use the data prepared by performing the fatigue test in advance using the same steel material as used in the designing. Generally, the fatigue strength of the metal material that has experienced prestrain increases in a high cycle region.

Figure 22:
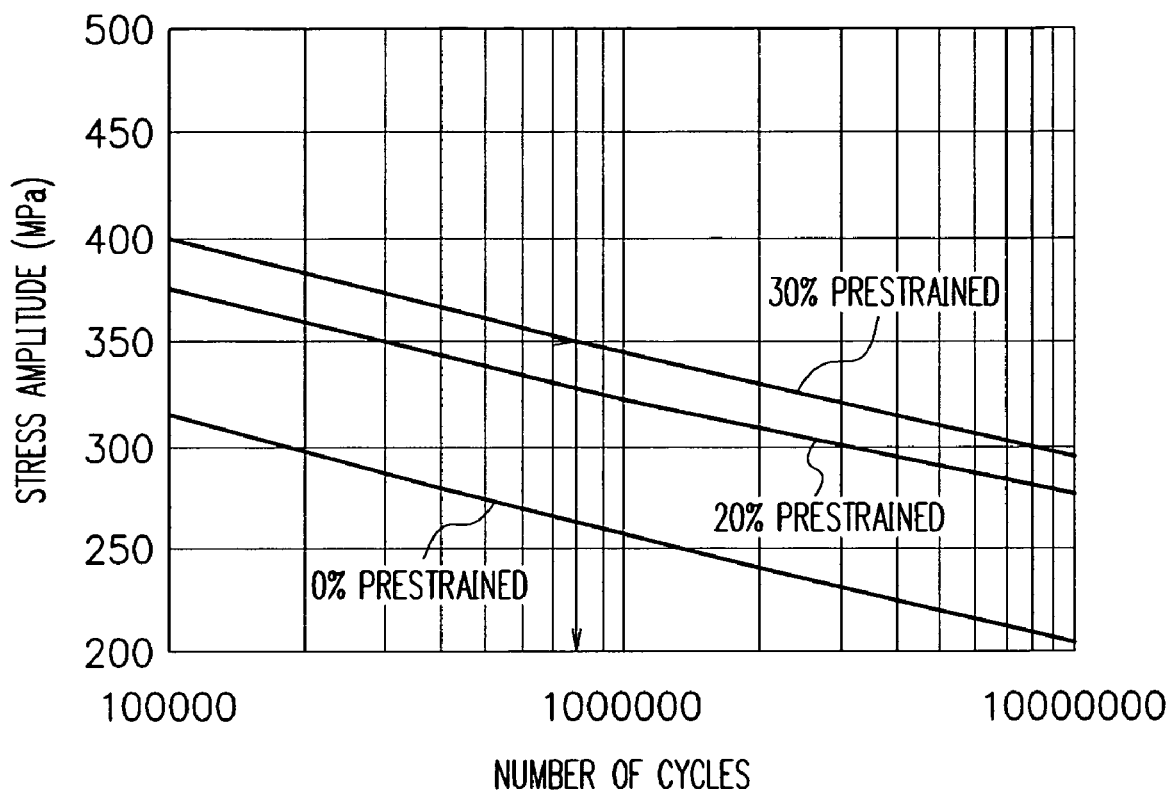
FIG. 22 is a characteristic view showing an example S-N diagram with respect to prestrains.

FIG. 22 is an S-N diagram showing an effect of the prestrain with respect to a steel material, which can be obtained by giving a predetermined strain to a fatigue test specimen in advance, and performing the fatigue test. As an example, at a position of a node point (node) in the finite element mesh model of the member, a prestrain of 30% is given and a fatigue load is added as well, and when the stress of 350 MPa arises at the node point, as shown by a dotted arrow in the drawing, the S-N line of the prestrain of 30% is selected, and the estimated fatigue life (number of cycles) at the node point can be calculated to be 800 thousand times. By the similar calculation method, the fatigue life is calculated for every node point in the finite element mesh model of the member, and out of the calculation results, the minimum value is defined as a predicted fatigue life.

As has been described, the residual stress generated at respective portions after assembling, the plastic strain arising when forming the member, and the sheet thickness variation are taken into consideration, while the press forming conditions making the fatigue life under the fatigue load conditions in compliance with the practical use environment of the member be the desired value is obtained in an accurate and speedy manner, so that the optimum member can be designed.

EXAMPLE

1. Design Target

Figure 23:
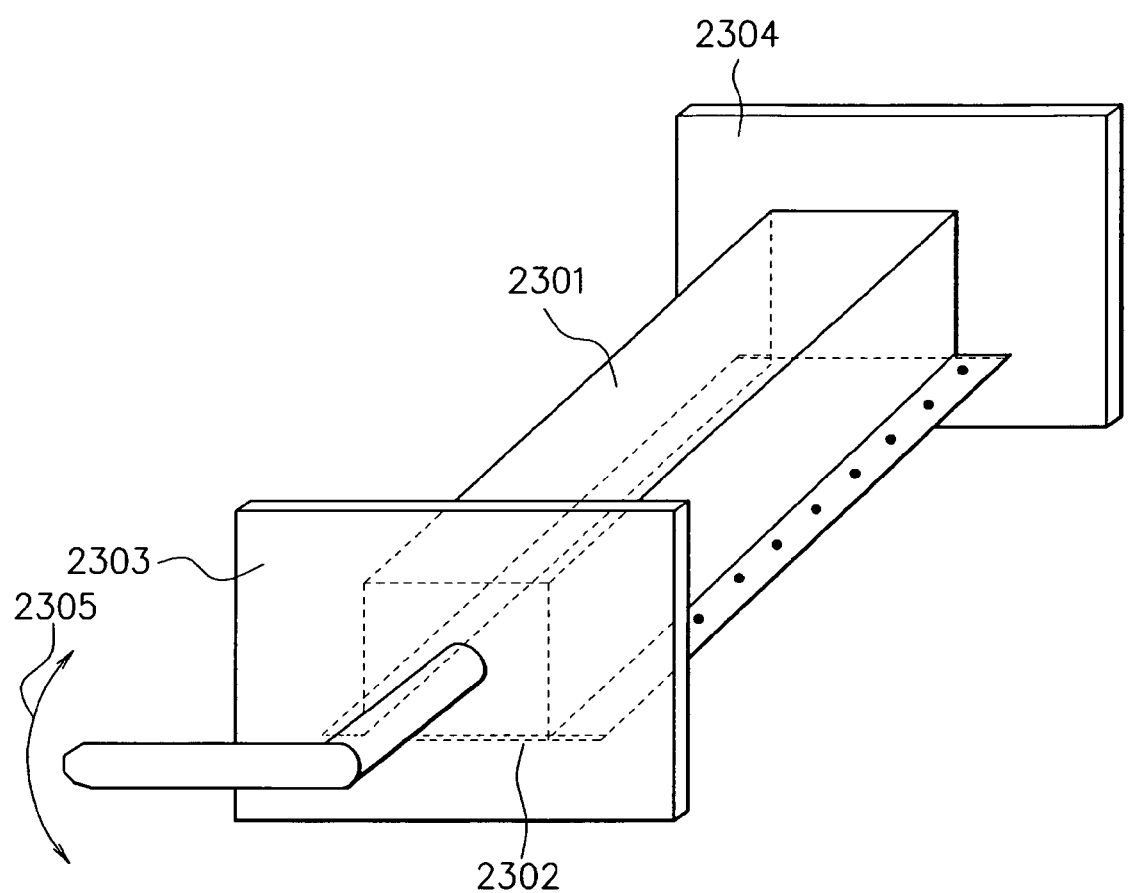
FIG. 23 is a view showing an outline of a fatigue strength test on a member having a hat-shape section.

As an example of the third embodiment, optimum press forming conditions for a member having a hat-shape section formed by spot welding a closing plate 2302 to a flange portion of a formed product 2301 having a hat-shape section as shown in FIG. 23 are designed. A fixing-side closing plate 2304 is completely fixed to the member having the hat-shape section by which the member having the hat-shape section is placed in a cantilever state, and a torsional fatigue load is repeatedly added around the long axis to obtain the optimum press forming condition (blank holder force) in which the fatigue life (number of cycles) is maximized. The cyclic fatigue load is a fatigue load 2305 of completely reversed torsion, being 400 Nm.

The size of the member having the hat-shape section 2301 is 300 mm in length, 120 mm in cross-sectional width, 70 mm in cross-sectional height, 20 mm in flange width and 1.4 mm in sheet thickness. The size of a closing plate 2303 is 160 mm in width, 300 mm in length and 1.4 mm in sheet thickness. The size of the force-applied-side closing plate 2303 and the fixing-side closing plate 2304 is 200 mm in width, 200 mm in length and 5.0 mm in sheet thickness, respectively. As for the size of the tools, the shape size of the punch mold and die mold are set based on the shape size of the formed product 2301 having the hat-shape section. The size of the material before forming is 300 mm in width, 300 mm in length and 1.4 mm in sheet thickness.

As the other press forming conditions, the length of stroke is defined as 70 mm, the initial blank holder force (BHF) is defined as 10 kN, and the friction coefficient is defined as 0.15. The yield strength of the material is 340 MPa, the stress-strain relation $$\sigma = 900 \times (\epsilon + 0.0006)^{0.17}.$$

Here, "σ" is an actual stress and "ε" is an actual strain.

2. Press Forming Analysis

The above-described press forming conditions are inputted and the press forming analysis is performed on the formed product 2301 having the hat-shape section using the commercially available finite element method program ABAQUS to thereby calculate the sheet thickness, the post-formation stress distribution and the post-formation strain distribution of the formed product.

3. Springback Analysis

The formed product 2301 having the hat-shape section and the closing plate 2302 are assembled on the computer into the member having the hat-shape section, and the springback analysis is performed based on the sheet thickness, the post-formation stress distribution and the post-formation strain distribution of the formed product 2301 having the hat-shape section as the springback analysis conditions by using the commercially available finite element method program ABAQUS, so that the residual stress of the member is calculated.

4. Elastic Analysis

The formed product 2301 having the hat-shape section, the closing plate 2302, the force-applied-side closing plate 2303 and the fixing-side closing plate 2304 are assembled on the computer into the member having the hat-shape section, and after that, the elastic analysis is performed based on the sheet thickness distribution of the formed product 2301 having the hat-shape section, the shape of the member and a torsional force 400 Nm as elastic analysis conditions using a commercially available finite element method program NASTRAN, so that the post-elastic deformation stress distribution and the post-elastic deformation strain distribution of the member are calculated.

5. Fatigue Analysis

The fatigue life (number of cycles) of the member having the hat-shape section when the torsional fatigue load is applied is calculated based on the post-formation strain distribution of the formed product 2301 having the hat-shape section calculated in the press forming analysis, the residual stress distribution of the member having the hat-shape section calculated in the springback analysis, the post-elastic formation stress distribution and the post-elastic deformation strain distribution of the member having the hat-shape section calculated in the elastic analysis, and the torsional force, as fatigue analysis conditions using a commercially available fatigue analysis program FE-Fatigue. Note that the S-N diagram for spot welding stored in the commercially available fatigue analysis software FE-Fatigue is used for the S-N data at the spot-welded portion, and the S-N diagram shown in FIG. 22 is used for the S-N data of the metal material portion of the member.

6. Press Forming Condition Change

Figure 18:
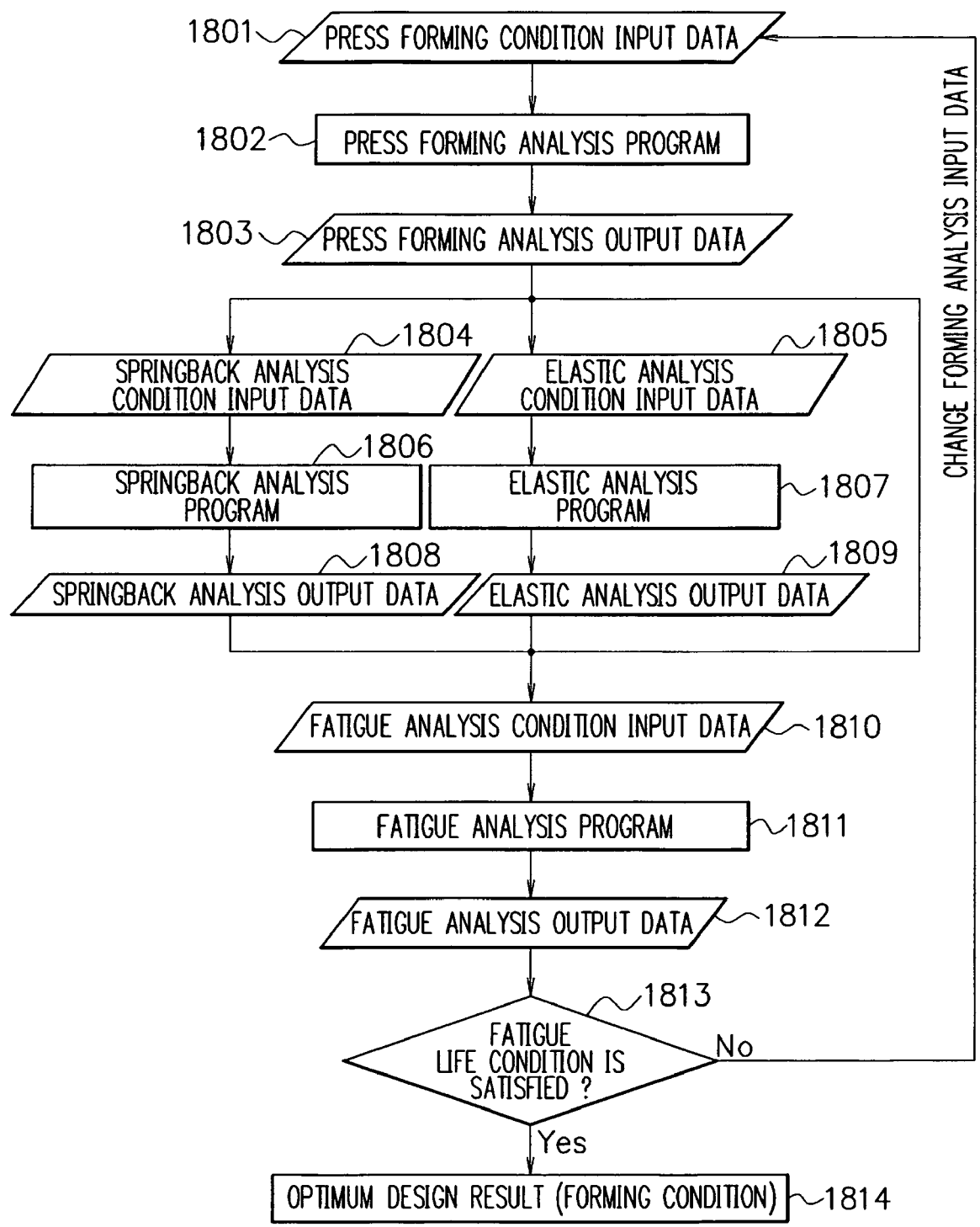
FIG. 18 is a flowchart to explain a member designing flow in a third embodiment.

For the optimization tool, the commercially available iSIGHT is used, in which the blank holder force is changed within the range from 10 kN to 350 kN, and the computer performs the step 1801 to step 1812 in FIG. 18 repeatedly 70 times, so that the optimum press design conditions maximizing the fatigue life is sought.

7. Result

As to the relation between the fatigue life and the blank holder force, too small blank holder force leads to large springback, in which the residual stress affecting the metal material portion and the spot welded portion of the structure is large, so that the fatigue life falls. Meanwhile, excessively large blank holder force leads to large reduction in the sheet thickness of the member, in which torsional rigidity (secondary moment of the section) falls to increase the stress generated at the metal material portion and/or the spot-welded portion, having a tendency to reduce the fatigue life. Further, an increase in the blank holder force causes a tension fracture at the time of the press formation, making the formation sometimes be impossible.

As a result of the search for the optimum press forming conditions by performing repetitive calculations in accordance with the fatigue designing method according to the present invention, it is found that the blank holder force is 200 kN and the maximum fatigue life (number of cycles) is 850 thousand times. The member is manufactured based on the press formed product press formed under this condition, and when the fatigue test is performed under the conditions: a cyclic fatigue load being the force under completely reversed torsion is 400 Nm, and a frequency of cyclic load is 5 Hz, using a hydraulic-servo fatigue testing machine exhibiting a maximum force of 10 kN, it is confirmed that, at the time when the number of cycles reaches to 1050 thousand times, a first crack is generated at the spot welded portion at the center portion, allowing the fatigue life over the target to be obtained.

Figure 24:
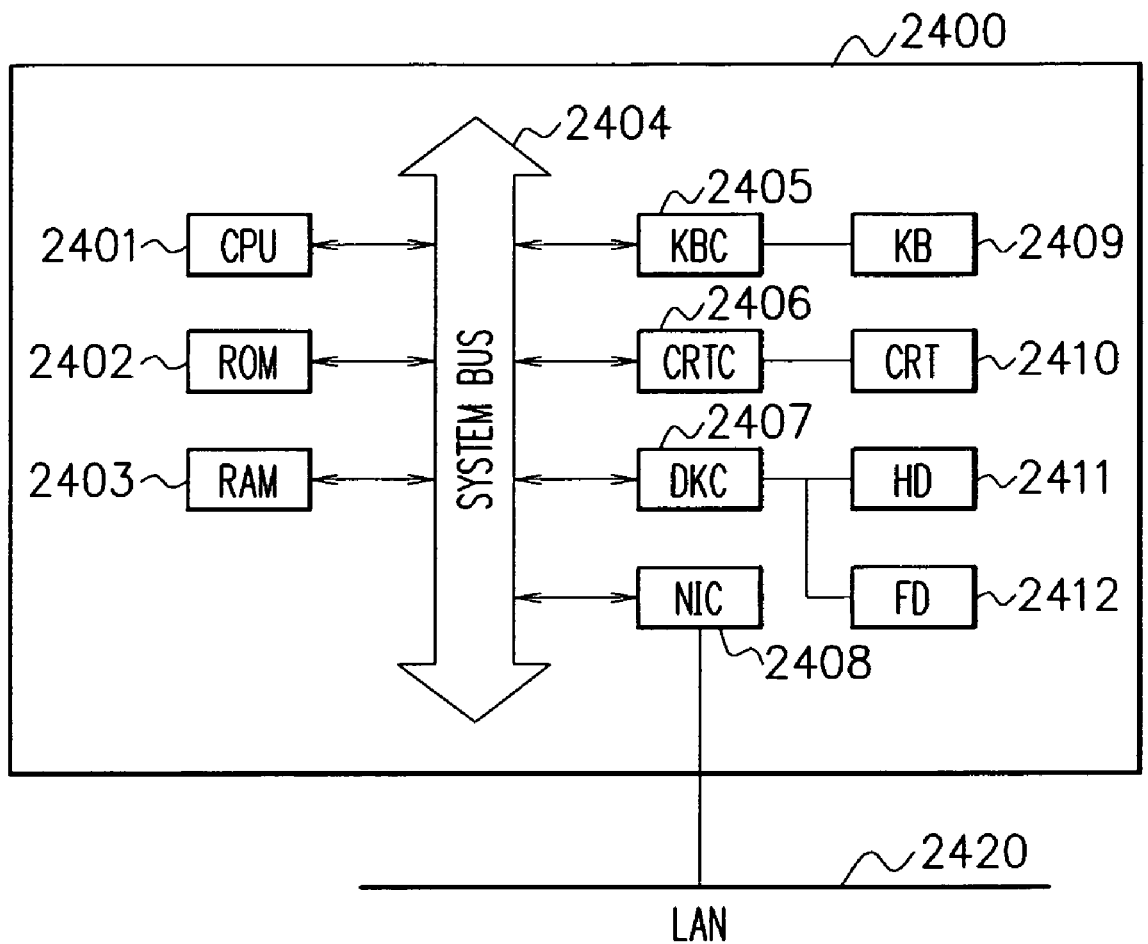
FIG. 24 is a block diagram showing an example computer system functioning as a designing apparatus.
Figure 25:
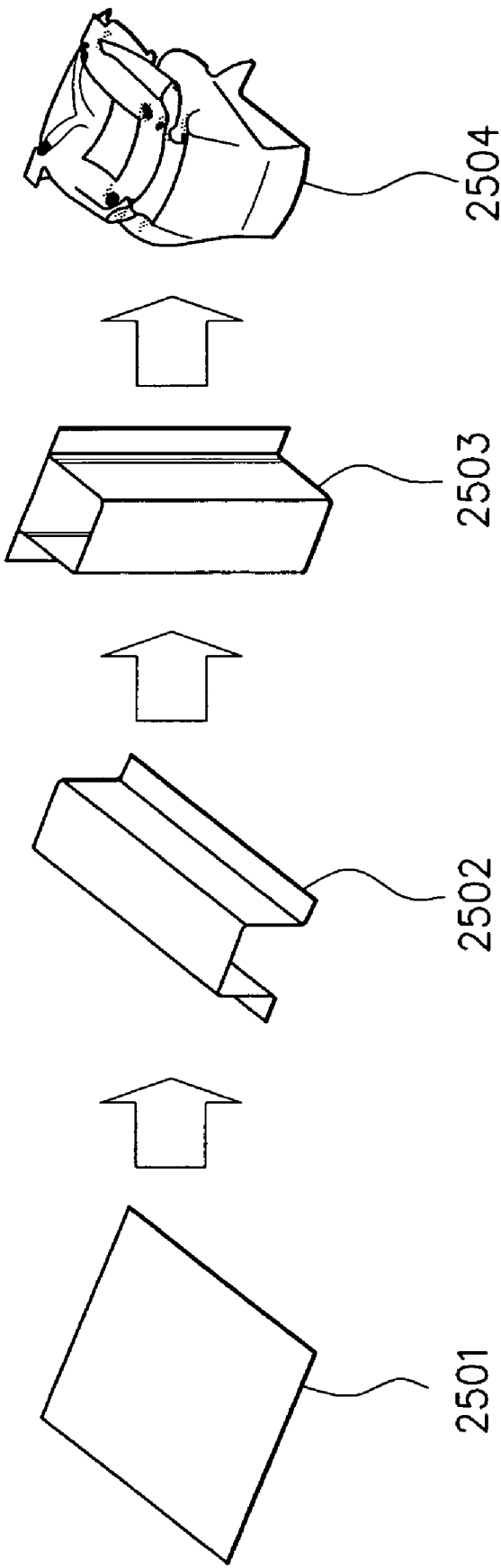
FIG. 25 is a view showing an example of conventional coupled analysis on forming process and crash.

FIG. 24 is a block diagram showing an example computer system serving as a designing apparatus capable of realizing the designing method of the above-described respective embodiments. In the drawing, "2400" denotes a computer PC. The PC 2004 includes a CPU 2401 and executes device control software recorded in a ROM 2402 or a hard disk (HD) 2411 or supplied from a flexible disk drive (FD) 2412 to comprehensively control the respective devices connected to a system bus 2404.

The respective functional means of the present embodiment are composed of the programs recorded in the CPU 2401, the ROM 2402 or the hard disk (HD) 2411 of the above-described PC 2400.

"2403" denotes a RAM and serves as a main memory of the CPU 2401, a work area, and so on. "2405" denotes a key board controller (KBC) controlling to input signals inputted from a key board (KB) 2409 into the system itself. "2406" denotes a display controller (CRTC) controlling a display on a display device (CRT) 2410. "2407" denotes a disk controller (DKC) controlling access to a boot program (activation program: starts executing (operating) hardware or software in a personal computer), the hard disk (HD) 2411 recording, a plurality of application, edit file, user file, network management program and so forth, and the flexible disk (FD) 2412.

"2408" denotes a network interface card (NIC) receiving and sending data interactively with a network printer, other network equipment or other personal computer via a LAN 2420.

Note that the present invention is applicable to both a system composed of plural equipment and a device composed of single equipment.

Further, not to mention, the object of the present invention can be achieved by supplying a recording medium, in which program code of software realizing the function of the above-described embodiments is recorded, to a system or a device and by reading out and executing the program code stored in the recording medium by the computer (CPU or MPU) of the system or the device.

In this case, the program code read out from the recording medium itself is to realize the functions of the above-described embodiments, so that the recording medium recording the program code composes the present invention. As a recording medium to supply the program code, for example, a flexible disk, a hard disk, an optical disk, a magnetic optical disk, a CD-ROM, a CD-R, a magnetic tape, an involatile memory card, a ROM, and the like can be used.

In the above, the present invention has been described together with various embodiments, however, the present invention is not limited only to these embodiments and can be changed and so forth within the scope of the present invention.

INDUSTRIAL APPLICABILITY

According to the present invention, an optimum member designing to obtain a desired performance including a press forming condition is realized while taking effects of a sheet thickness variation and a work hardening due to a plastic working when manufacturing a member into consideration.

What is claimed is:

1. A member designing method comprising:
a first step where a computer performs press forming analysis based on a shape of a formed product or a shape of a member, a blank holder force, a friction coefficient, a tensile strength of a material, a yield strength, a stress-strain relation, and a sheet thickness, as press forming conditions, to calculate sheet thickness distribution and post-formation strain distribution of the formed product, said member comprising one or more formed products finished and assembled; and
a second step where the computer performs performance analysis based on the sheet thickness distribution, the post-formation strain distribution, and the shape of the formed product or the shape of the member, as state amounts of the formed product, to calculate performance of the member,
wherein the computer repeats the calculations performed in the process from said first step through said second step a predetermined number of times, with at least one of the press forming conditions being changed, to output an optimum press forming condition that gives a maximum value or a target value of the performance.

2. The member designing method according to claim 1, wherein the press forming conditions further include at least one kind or two kinds or more selected from a shape of the material before forming, a tool shape, and a length of stroke.

3. The member designing method according to claim 2, wherein the computer performs the press forming analysis to further calculate post-formation stress distribution, and
wherein the computer performs the performance analysis of the formed product further based on the post-formation stress distribution as the state amount.

4. The member designing method according to claim 2, wherein the press forming conditions further include a pad pressure of a punch top portion.

5. The member designing method according to claim 1, wherein the computer performs the press forming analysis to further calculate post-formation stress distribution, and
wherein the computer performs the performance analysis of the formed product further based on the post-formation stress distribution as the state amount.

6. The member designing method according to claim 1, wherein, in said performance analysis, the computer performs crash analysis of the formed product further based on an impact force as the state amount to calculate a crash absorbed energy and a deformation mode, and defines the crash absorbed energy as the performance of the member.

7. The member designing method according to claim 6, wherein the shape of the member is a tailored blank and the computer performs the press forming analysis further based on a weld line position of the tailored blank.

8. The member designing method according to claim 6, wherein the computer performs crash analysis further based on a joining condition of the member as a crash analysis condition.

9. The member designing method according to claim 1, wherein the press forming conditions further include a pad pressure of a punch top portion.

10. The member designing method according to claim 1, wherein the shape of the member is a tailored blank and the computer performs the press forming analysis further based on a weld line position of the tailored blank.

11. The member designing method according to claim 1, wherein in said performance analysis:
after the member is assembled on the computer based on the formed products, the computer performs springback analysis based on the sheet thickness distribution, the post-formation stress distribution, and the shape of the member to calculate residual stress distribution of the member;
the computer performs elastic analysis based on the sheet thickness distribution, the shape of the member, and a static load, as elastic analysis conditions, to calculate post-elastic deformation stress distribution and post-elastic deformation strain distribution of the member; and
the computer performs fatigue analysis based on the post-formation strain distribution, the residual stress distribution, the post-elastic deformation stress distribution, the post-elastic deformation strain distribution, and a fatigue load, as fatigue analysis conditions, to define fatigue life as the performance of the member.

12. The member designing method according to claim 1, wherein in said performance analysis:
the computer performs springback analysis based on the sheet thickness distribution, the post-formation stress distribution, and the shape of the member to calculate displacement distribution of the formed product;
thereafter, the member is assembled on the computer based on the formed products, and the computer calculates residual stress distribution of the member and performs elastic analysis based on the sheet thickness distribution, the shape of the member, and a static load, as elastic analysis conditions, to calculate post-elastic deformation stress distribution and post-elastic deformation strain distribution of the member; and
the computer performs fatigue analysis based on the post-formation strain distribution, the residual stress distribution, the post-elastic deformation stress distribution, the post-elastic deformation strain distribution, and a fatigue load, as fatigue analysis conditions, to define fatigue life as the performance of the member.

13. A member designing method comprising:
a first step where a computer performs press forming analysis based on a shape of a formed product or a shape of a member, a blank holder force, a friction coefficient, a tensile strength of a material, a yield strength, a stress-strain relation, and a sheet thickness, as press forming conditions, to calculate sheet thickness distribution and post-formation strain distribution of the formed product, said member comprising one or more formed products finished and assembled; and
a second step where the computer performs performance analysis based on the sheet thickness distribution, the post-formation strain distribution, and the shape of the formed product or the shape of the member, as state amounts of the formed product, to calculate performance of the member,
wherein
in said performance analysis, the computer performs crash analysis of the formed product further based on a joining condition of the member and an impact force as the state amount to calculate a crash absorbed energy and a deformation mode, and defines the crash absorbed energy as the performance of the member,
the computer repeats the calculations performed in the process from said first step through said second step a predetermined number of times, with at least one of the press forming conditions being changed, to output an optimum joining condition of the member that gives a maximum value or a target value of the performance.

14. The member designing method according to claim 13, wherein the joining condition is changed during the repeated calculations performed in the process from said first step through said second step.

15. A member designing apparatus comprising:
a press forming condition input part via which a shape of a formed product or a shape of a member, a blank holder force, a friction coefficient, a tensile strength of a material, a yield strength, a stress-strain relation, and a sheet thickness are inputted as press forming conditions into a computer, said member comprising one or more formed products finished and assembled;
a press forming analyzer that performs press forming analysis based on the shape of the formed product or the shape of the member, the blank holder force, the friction coefficient, the tensile strength of the material, the yield strength, the stress-strain relation, and the sheet thickness which are inputted via said press forming condition input part, and calculates sheet thickness distribution and post-formation strain distribution of the formed product;
a performance analyzer that performs performance analysis of the formed product based on the sheet thickness distribution, the post-formation strain distribution, and the shape of the formed product or the shape of the member, as state amounts, and calculates performance of the member;
a repetitive calculation controller that automatically executes the calculations performed in the process from said press forming condition input part through said performance analyzer a predetermined number of times, with at least one of the press forming conditions being changed; and
an optimum forming condition output part that outputs an optimum press forming condition that gives a maximum value or a target value of the performance.

16. The member designing apparatus according to claim 15, comprising a press forming input part via which at least one kind or two kinds or more selected from a shape of the material before forming, a tool shape, and a length of stroke are further inputted as the press forming conditions.

17. The member designing apparatus according to claim 16,
wherein said press forming analyzer further calculates post-formation stress distribution, and wherein said performance analyzer performs the performance analysis of the formed product further based on the post-formation stress distribution as the state amount.

18. The member designing apparatus according to claim 15,
wherein said press forming analyzer further calculates post-formation stress distribution, and wherein said performance analyzer performs the performance analysis of the formed product further based on the post-formation stress distribution as the state amount.

19. The member designing apparatus according to claims 15,
wherein said performance analyzer further performs crash analysis of the formed product based on an impact force as the state amount to calculate a crash absorbed energy and a deformation mode, and defines the crash absorbed energy as the performance of the member.

20. The member designing apparatus according to claims 19,
wherein said performance analyzer includes a crash analyzer that performs crash analysis further based on a joining condition of the member as the state amount.

21. The member designing apparatus according to claim 15, further comprising a press forming analysis part further including a pad pressure of a punch top portion as a press forming condition, and performing press forming analysis based on the shape of the product or the shape of the member, the blank holder force, the friction coefficient, the tensile strength of the material, the yield strength, the stress-strain relation, the sheet thickness, and the pad pressure of the punch top portion inputted into said press forming condition input part to calculate the sheet thickness and the strain distribution of the formed product.

22. The member designing apparatus according claims 15, wherein the shape of the member is a tailored blank;
wherein a weld line position of the tailored blank is further inputted into said press forming condition input part, and
wherein said member designing apparatus further comprises a press forming analysis part performing press forming analysis based on the shape of the formed product or the shape of the member, the blank holder force, the friction coefficient, the tensile strength of the material, the yield strength, the stress-strain relation, the sheet thickness, and the weld line position of the tailored blank to calculate the sheet thickness distribution and the strain distribution of the formed product.

23. The member designing apparatus according to claim 15,
wherein said performance analyzer comprises:
a springback analyzer that, after the member is assembled on a computer based on the formed product, performs springback analysis based on the sheet thickness distribution, the post-formation stress distribution, and the shape of the member to calculate residual stress distribution of the member;
an elasticity analyzer that performs elastic analysis based on the sheet thickness distribution, the shape of the member, and a static load, as elastic analysis conditions, to calculate post-elastic deformation stress distribution and post-elastic deformation strain distribution of the member; and a fatigue analyzer that performs fatigue analysis based on the post-formation strain distribution calculated by said press forming analyzer, the residual stress distribution of the member calculated by said springback analyzer, the post-elastic deformation stress distribution and the post-elastic deformation strain distribution of the member calculated by said elasticity analyzer, and a fatigue load, as fatigue analysis conditions, to calculate fatigue life of the member, wherein the fatigue life is defined as the performance of the member.

24. The member designing apparatus according to claims 15, wherein said performance analyzer comprises:

a springback analyzer that performs springback analysis based on the sheet thickness distribution, the post-formation stress distribution, and the shape of the member to calculate displacement distribution of the formed product;

an elasticity analyzer that assembles the member on the computer based on the formed products, calculates residual stress distribution of the member and performs elastic analysis based on the sheet thickness distribution calculated by said press forming analyzer, the shape of the member, and a static load, as elastic analysis conditions, to calculate post-elastic deformation stress distribution and post-elastic deformation strain distribution of the member; and a fatigue analyzer that performs fatigue analysis based on the post-formation strain distribution calculated by said press forming analyzer, the residual stress distribution of the member calculated by said springback analyzer, the post-elastic deformation stress distribution and the post-elastic deformation strain distribution which are calculated by said elasticity analyzer, and a fatigue load, as fatigue analysis conditions, to calculate fatigue life of the member, wherein the fatigue life is defined as the performance of the member.

25. A member designing apparatus, comprising:

a press forming condition input part via which a shape of a formed product or a shape of a member, a blank holder force, a friction coefficient, a tensile strength of a material, a yield strength, a stress-strain relation, and a sheet thickness are inputted as press forming conditions into a computer said member comprising one or more formed products finished and assembled;

a press forming analyzer that performs press forming analysis based on the shape of the formed product or the shape of the member, the blank holder force, the friction coefficient, the tensile strength of the material, the yield strength, the stress-strain relation, and the sheet thickness which are inputted via said press forming condition input part, and calculates sheet thickness distribution and post-formation strain distribution of the formed product;

a performance analyzer that performs performance analysis of the formed product based on the sheet thickness distribution, the post-formation strain distribution, and the shape of the formed product or the shape of the member, as state amounts, and calculates performance of the member;

a repetitive calculation controller that automatically executes the calculations performed in the process from said press forming condition input part through said performance analyzer a predetermined number of times, with at least one of the press forming conditions being changed; and an optimum joining condition output part that outputs an optimum joining condition of the member that gives a maximum value or a target value of the performance, wherein said performance analyzer further includes a crash analyzer that performs crash analysis of the formed product based on an impact force as one of the state amounts to calculate a crash absorbed energy and a deformation mode, and further based on a joining condition of the member as another of the state amounts, and defines the crash absorbed energy as the performance of the member.

26. The member designing apparatus according to claim 25, further comprising a joining condition input part via which a joining condition of the member is inputted into the computer, wherein the joining condition is changed during the repeated crash analysis.

27. A non-transitory computer-readable recording medium in which a computer program product is recorded, comprising:

a program code causing a computer to perform press forming analysis based on a shape of a formed product or a shape of a member, a blank holder force, a friction coefficient, a tensile strength of a material, a yield strength, a stress-strain relation, and a sheet thickness, as press forming conditions, and calculate sheet thickness distribution and post-formation strain distribution of the formed product, said member comprising one or more formed products finished and assembled; and a program code for causing the computer to perform performance analysis of the formed product based on the sheet thickness distribution, the post- formation strain distribution, and the shape of the formed product or the shape of the member, as state amounts of the formed product, and calculate performance of the member, wherein the computer is caused to repeat the calculations a predetermined number of times, with at least one of the press forming conditions being changed, and to output an optimum press forming condition that gives a maximum value or a target value of the performance.

28. The non-transitory computer-readable recording medium according to claim 27, wherein the press forming conditions further include at least one kind or two kinds or more selected from a shape of the material before forming, a tool shape, and a length of stroke.

29. The non-transitory computer-readable recording medium according to claim 28, wherein the computer performs the press forming analysis and further calculates post-formation stress distribution, and wherein the computer performs the performance analysis of the formed product further based on the post-formation stress distribution as the state amount.

30. The non-transitory computer-readable recording medium according to claim 28, wherein the press forming conditions further include a pad pressure of a punch top portion.

31. The non-transitory computer-readable recording medium according to claim 27, wherein the computer performs the press forming analysis and further calculates post-formation stress distribution, and wherein the computer performs the performance analysis of the formed product further based on the post-formation stress distribution as the state amount.

32. The non-transitory computer-readable recording medium according to claim 27,
wherein, in said performance analysis, the computer further performs crash analysis of the formed product based on an impact force as the state amount to calculate a crash absorbed energy and a deformation mode, and defines the crash absorbed energy as the performance of the member.

33. The non-transitory computer-readable recording medium according to claim 32,
wherein the shape of the member is a tailored blank and the computer performs the press forming analysis further based on a weld line position of the tailored blank.

34. The non-transitory computer-readable recording medium according to claim 32,
wherein the computer performs crash analysis further based on a joining condition of the member as a crash analysis condition.

35. The non-transitory computer-readable recording medium according to claim 27,
wherein the press forming conditions further include a pad pressure of a punch top portion.

36. The non-transitory computer-readable recording medium according to claim 27,
wherein the shape of the member is a tailored blank and the computer performs the press forming analysis further based on a weld line position of the tailored blank.

37. The non-transitory computer-readable recording medium according to claims 27,
wherein, in said performance analysis:
after the member is assembled based on the formed products, the computer performs springback analysis based on the sheet thickness distribution, the post-formation stress distribution, and the shape of the member to calculate residual stress distribution of the member;
the computer performs elastic analysis based on the sheet thickness distribution, the shape of the member, and a static load, as elastic analysis conditions, to calculate post-elastic deformation stress distribution and post-elastic deformation strain distribution of the member; and
the computer performs fatigue analysis based on the post-formation strain distribution, the residual stress distribution, the post-elastic deformation stress distribution, the post-elastic deformation strain distribution, and a fatigue load, as fatigue analysis conditions, to define fatigue life as the performance of the member.

38. The non-transitory computer-readable recording medium according to claim 27,
wherein, in said performance analysis:
the computer performs springback analysis based on the sheet thickness distribution, the post-formation stress distribution, and the shape of the member to calculate displacement distribution of the formed product;
thereafter the member is assembled on the computer based on the formed product, and the computer calculates residual stress distribution of the member and performs elastic analysis based on the sheet thickness distribution, the shape of the member, and a static load, as elastic analysis conditions, to calculate post-elastic deformation stress distribution and post-elastic deformation strain distribution of the member; and
the computer performs fatigue analysis based on the post-formation strain distribution, the residual stress distribution, the post-elastic deformation stress distribution, the post-elastic deformation strain distribution, and a fatigue load, as fatigue analysis conditions, to define fatigue life as the performance of the member.

39. A non-transitory computer-readable recording medium in which a computer program product is recorded, comprising:
a program code causing a computer to perform press forming analysis based on a shape of a formed product or a shape of a member, a blank holder force, a friction coefficient, a tensile strength of a material, a yield strength, a stress-strain relation, and a sheet thickness, as press forming conditions, and calculate sheet thickness distribution and post-formation strain distribution of the formed product said member comprising one or more formed products finished and assembled; and
a program code for causing the computer to perform performance analysis of the formed product based on the sheet thickness distribution, the post-formation strain distribution, and the shape of the formed product or the shape of the member, as state amounts of the formed product, and calculate performance of the member,
wherein
in said performance analysis, the computer further performs crash analysis of the formed product based on a joining condition of the member and an impact force as the state amount to calculate a crash absorbed energy and a deformation mode, and defines the crash absorbed energy as the performance of the member,
the computer is caused to repeat the calculations a predetermined number of times, with at least one of the press forming conditions being changed, and to output an optimum joining condition of the member that gives a maximum value or a target value of the performance.

40. The non-transitory computer-readable recording medium according to claim 39, wherein the joining condition is changed during the repeated calculations.

* * * * *